US008006080B2

(12) United States Patent  
Yamaji

(10) Patent No.: US 8,006,080 B2  
(45) Date of Patent: Aug. 23, 2011

(54) APPARATUS, METHOD, COMPUTER PROGRAM AND RECORDING MEDIUM FOR PROCESSING INFORMATION

(75) Inventor: Hidenori Yamaji, Tokyo (JP)

(73) Assignee: Sony Corporation (JP)

( * ) Notice: Subject to any disclaimer, the term of this patent is extended or adjusted under 35 U.S.C. 154(b) by 902 days.

(21) Appl. No.: 12/005,636

(22) Filed: Dec. 27, 2007

(65) Prior Publication Data

US 2008/0222410 A1    Sep. 11, 2008

(30) Foreign Application Priority Data

Dec. 28, 2006  (JP) ............................... P2006-355748

(51) Int. Cl.  
*G06F 15/177* (2006.01)
(52) U.S. Cl. ................................. 713/2; 713/1; 713/323
(58) Field of Classification Search .................. None  
See application file for complete search history.

(56) References Cited

U.S. PATENT DOCUMENTS

| | | | | |
|---|---|---|---|---|
| 6,173,291 | B1 * | 1/2001 | Jenevein .............................. | 1/1 |
| 6,615,365 | B1 * | 9/2003 | Jenevein et al. ................... | 714/6 |
| 2008/0180564 | A1 * | 7/2008 | Yamaji ........................... | 348/372 |
| 2008/0184050 | A1 * | 7/2008 | Yamaji et al. ................. | 713/323 |

FOREIGN PATENT DOCUMENTS

| | | | |
|---|---|---|---|
| JP | 5-334159 | A | 12/1993 |
| JP | 10-207588 | A | 8/1998 |
| JP | 2003-022663 | A | 1/2003 |
| JP | 2004-007075 | A | 1/2004 |
| JP | 2006-236161 | A | 9/2006 |

* cited by examiner

*Primary Examiner* — Dennis M Butler  
(74) *Attorney, Agent, or Firm* — Lerner, David, Littenberg, Krumholz & Mentlik, LLP

(57) ABSTRACT

An information processing apparatus for transitioning from an operating state for performing a process in accordance with an application program to a pause state and for transitioning back from the pause state to the operating state in one of a plurality of startup methods, may include a startup method determination unit for determining whether the startup method in a transition from the pause state to the operating state is a predetermined one of the plurality of startup methods, a capacity calculation unit for calculating a capacity available in a recording medium loaded on own information processing apparatus if the startup method is the predetermined one of the plurality of startup methods, and a recovery execution determination unit for determining whether to perform a recovery program for recovering an index of a file system managing data, recorded on the recording medium, based on the calculated capacity available in the recording medium.

8 Claims, 27 Drawing Sheets

FIG. 7

| | HOST CPU | SDRAM | EMBEDDED CONTROLLER (RTC) |
|---|---|---|---|
| OPERATING STATE S0 | ON | ON | ON |
| SUSPENSION STATE S3 | OFF | ON | ON |
| HIBERNATION STATE S4 SOFT-OFF STATE S5 | OFF | OFF | ON |
| MECHANICAL-OFF STATE G3 | OFF | OFF | OFF (RTC IN OPERATION) |

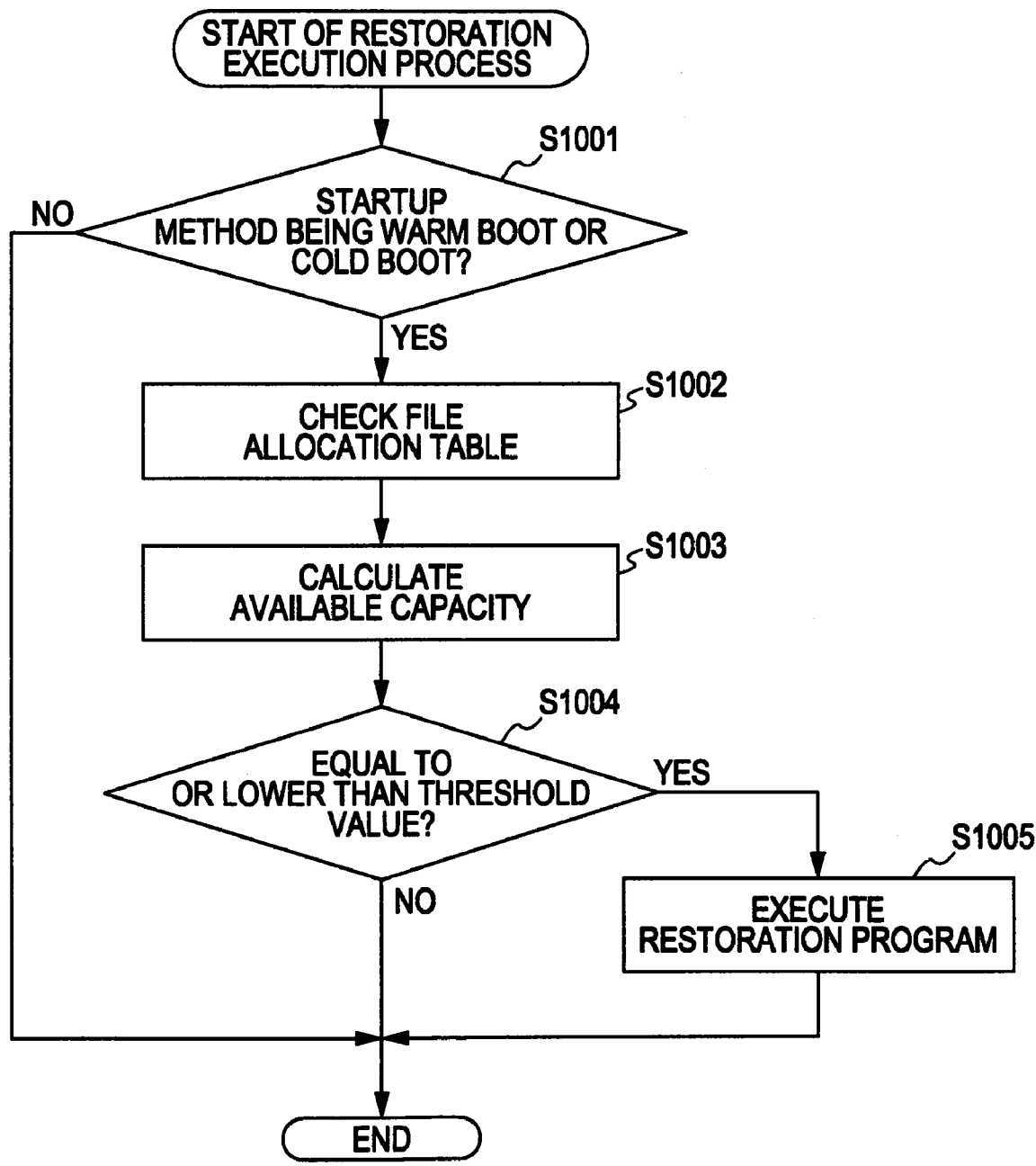

APPARATUS, METHOD, COMPUTER PROGRAM AND RECORDING MEDIUM FOR PROCESSING INFORMATION

CROSS-REFERENCE TO RELATED APPLICATIONS

This application claims priority from Japanese Patent Application No. JP 2006-355748 filed in the Japanese Patent Office on Dec. 28, 2006, the entire content of which is incorporated herein by reference.

BACKGROUND OF THE INVENTION

1. Field of the Invention

The present invention relates to an image processing apparatus, an image processing method and a computer program and, in particular, to an image processing apparatus, an image processing method and a computer program for permitting quick startup in an apparatus and effectively using in the apparatus a recording medium as a resource having a predetermined recording capacity.

2. Description of the Related Art

A file system for use in management of data to be recorded on a recording medium is mounted in computer operating systems. The file system accesses data chunks arranged by a sector (a recording unit of 512 bytes) on the recording medium typically supplied in an auxiliary recording device. The file system forms files and directories using a group of sectors. Information indicating which sector is managed by which file and which sectors remain unused is managed by the file system.

In the file system, a file name is mapped to a recording unit such as sector by an index (such as an index in a file allocation table). The index is managed as in FAT of a file system of MS-DOS (Registered Trademark) or as in inode in UNIX (Registered Trademark) file system.

The file allocation table contains information regarding which sector is managed by which file and which sectors remain unused. In a process such as data recording or data deletion to a recording medium, the file allocation table is correctly updated. The recording medium is thus effectively utilized in computer processing.

In the file system, data reading or data writing is performed by performing processes such as system calls "open," "read," "write," and "close."

A data write process through the file system is performed by caching data on a main memory of a computer. Data cached on the main memory is later written on a hard disk drive (HDD). In the process of the file system, the file allocation table relating to information of used sectors is updated in accordance with an amount data to be written, and is transferred to a recording medium such as the HDD at a data speed of a bus as a background job. When a system call "close" process in the file system is completed, all data cached is written on the recording medium such as the HDD. The data write process is thus completed.

In this way, time to write data onto the recording medium such as the HDD is hidden from users and response time is shortened. Data rate on the HDD is typically slower than data rate to the main memory.

When the computer is switched off prior to the end of the system call "close" process, data cached on the main memory is missing without being fully written on the HDD. The information regarding the used sectors in the file allocation table is updated, and a sector actually not used can be recognized as an actually used sector.

If the computer is repeatedly switched off prior to the end of the system call "close" process, the available memory capacity of the recording medium appears to be reduced although the amount of data recorded on the recording medium does not increase.

Available programs recovers information of sectors used in the file allocation table so that information regarding the actually used sectors is consistent with information regarding the sectors used in the file allocation table.

Japanese Unexamined Patent Application Publication No. 2003-022663 discloses another technique for producing, searching and reading a file at a fast speed. In accordance with the disclosure, an empty area formed of at least one unit area is found in an information recording medium, a header address of the found empty area is acquired. The acquired header address is attached to data as identification information of the data. The data is thus managed with the identification information mapped thereto.

SUMMARY OF THE INVENTION

In consumer electronics (CEs) such as digital still cameras, apparatuses can be switched off prior to the end of the system call "close" process due to a voltage drop in a battery or an inappropriate operation by users.

If the program for recovering information of sectors used in the file allocation table so that information regarding the actually used sectors is consistent with information regarding the sectors used in the file allocation table is used, power needs to be supplied to the apparatus to execute the recovery program. Since the recovery program takes some time, a battery needs to continuously supply power to the digital still camera, for example. Apparatuses featuring quick startup, which is a typical user requirement, cannot afford to execute such a program.

It may thus be desirable to start up apparatuses quickly and allow a recording medium to be used as a resource having a predetermined recording capacity.

In accordance with one embodiment of the present invention, an information processing apparatus for transitioning from an operating state for performing a process in accordance with an application program to a pause state and for transitioning back from the pause state to the operating state in one of a plurality of startup methods, may include a startup method determination unit for determining whether the startup method in a transition from the pause state to the operating state is a predetermined one of the plurality of startup methods, a capacity calculation unit for calculating a capacity available in a recording medium loaded on own information processing apparatus if the startup method determination unit determines that the startup method is the predetermined one of the plurality of startup methods, and a recovery execution determination unit for determining whether to perform a recovery program for recovering an index of a file system managing data, recorded on the recording medium, based on the capacity available in the recording medium calculated by the capacity calculation unit.

The plurality of startup methods may include at least a first startup method and a second startup method. Data loading to a main memory may not be performed in the first startup method, and data responsive to a software program to be performed by a processor in the operating state may be loaded onto the main memory in the second startup method.

Preferably, if the startup method determination unit determines the startup method is the second startup method, the capacity calculation unit calculates the available capacity and the recovery execution determination unit determines whether to perform the recovery program.

Preferably, the recovery execution determination unit outputs determination results to execute the recovery program if the available capacity of the recording medium is not higher than a predetermined threshold value.

Preferably, if the recovery execution determination unit outputs determination results to execute the recovery program, the processor executes the recovery program so that information regarding a sector having the index used therewithin is recovered in a manner such that a sector actually used in the recording medium is consistent with the information regarding the sector having the index used therewithin.

In accordance with one embodiment of the present invention, an information processing method of an information processing apparatus for transitioning from an operating state for performing a process in accordance with an application program to a pause state and for transitioning back from the pause state to the operating state in one of a plurality of startup methods, may include determining whether the startup method in a transition from the pause state to the operating state is a predetermined one of the plurality of startup methods, calculating a capacity available in a recording medium loaded on own information processing apparatus if the startup method is determined to be the predetermined one of the plurality of startup methods and determining whether to perform a recovery program for recovering an index of a file system managing data, recorded on the recording medium, based on the calculated capacity available in the recording medium.

In accordance with one embodiment of the present invention, a computer-readable program for causing an information processing apparatus to transition from an operating state for performing a process in accordance with an application program to a pause state and transition back from the pause state to the operating state in one of a plurality of startup methods, may include determining whether the startup method in a transition from the pause state to the operating state is a predetermined one of the plurality of startup methods, calculating a capacity available in a recording medium loaded on own information processing apparatus if the startup method is determined to be a predetermined one of the plurality of startup methods, and determining whether to perform a recovery program for recovering an index of a file system managing data, recorded on the recording medium, based on the calculated capacity available in the recording medium.

In accordance with embodiments of the present invention, it may be determined in the transition from the pause state to the operating state whether the startup method is the predetermined one of the plurality of startup methods. If it is determined that the startup method is the predetermined type of the startup methods, the available capacity of the recording medium loaded on the information processing apparatus may be calculated. It may then be determined whether to perform the recovery program for recovering the index of the file system managing data, recorded on the recording medium, based on the calculated capacity available in the recording medium.

In accordance with embodiments of the present invention, apparatuses may be quickly started up and the recording medium may be effectively used as a resource having a predetermined recording capacity.

BRIEF DESCRIPTION OF THE DRAWINGS

FIG. 7 illustrates states of the digital still camera;

FIG. 27 is a flowchart illustrating an example of a recovery execution process.

DETAILED DESCRIPTION

Figure 1:
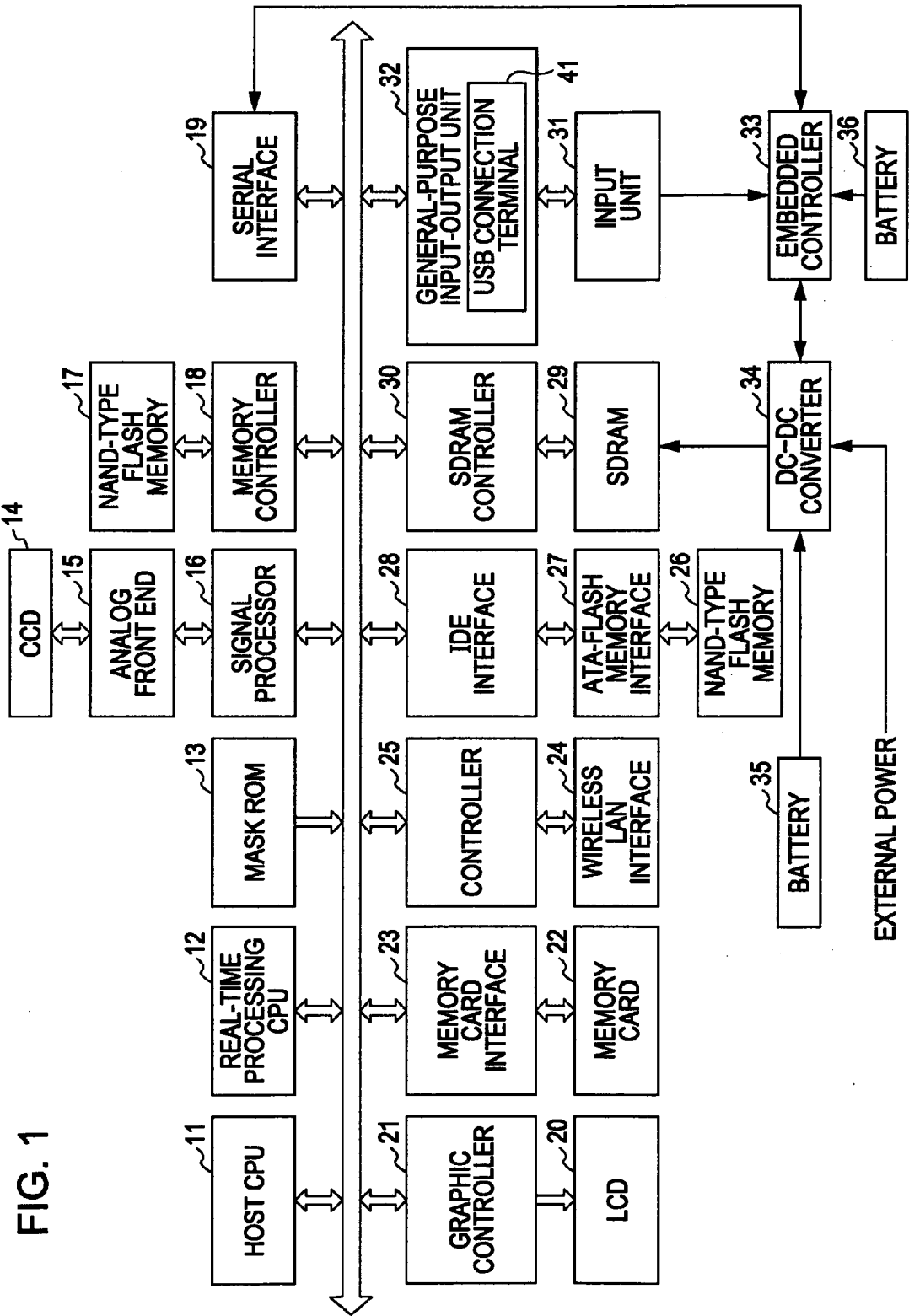
FIG. 1 is a block diagram of a digital still camera as an example of an information processing apparatus in accordance with one embodiment of the present invention.

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

In accordance with one embodiment of the present invention, an information processing apparatus for transitioning from an operating state for performing a process in accordance with an application program to a pause state and for transitioning back from the pause state to the operating state in one of a plurality of startup methods, includes a startup method determination unit (for example, host CPU 11 of FIG. 1 for performing step S1001 of FIG. 27) for determining whether the startup method in a transition from the pause state to the operating state is a predetermined one of the plurality of startup methods, a capacity calculation unit (for example, host CPU 11 of FIG. 1 for performing step S1003 of FIG. 27) for calculating a capacity available in a recording medium loaded on own information processing apparatus if the startup method determination unit determines that the startup method is the predetermined one of the plurality of startup methods, and a recovery execution determination unit (for example, host CPU 11 of FIG. 1 for performing step S1004 of FIG. 27) for determining whether to perform a recovery program for recovering an index of a file system managing data, recorded on the recording medium, based on the capacity available in the recording medium calculated by the capacity calculation unit.

In accordance with one embodiment of the present invention, a computer-readable program for causing an information processing apparatus to transition from an operating state for performing a process in accordance with an application program to a pause state and transition back from the pause state to the operating state in one of a plurality of startup methods, includes steps of determining whether the startup method in a transition from the pause state to the operating state is a predetermined one of the plurality of startup methods (for example, in step S1001 of FIG. 27), calculating a capacity available in a recording medium loaded on own information processing apparatus if the startup method is determined to be a predetermined one of the plurality of startup methods (for example, in step S1003 of FIG. 27), and determining whether to perform a recovery program for recovering an index of a file system managing data, recorded on the recording medium, based on the calculated capacity available in the recording medium (for example, in step S1004 of FIG. 27).

The embodiments of the present invention are described below with reference to the drawings.

FIG. 1 is a block diagram illustrating a digital still camera as one example of information processing apparatus in accordance with one embodiment of the present invention.

The digital still camera includes a host CPU 11, a real-time processing CPU 12, a mask read-only memory (ROM) 13, a charge-coupled device (CCD) 14, an analog front end 15, a signal processor 16, a NAND-type flash memory 17, a memory controller 18, a serial interface 19, a liquid-crystal display (LCD) 20, a graphic controller 21, a memory card 22, a memory card interface 23, a wireless local area network (LAN) interface 24, a controller 25, a NAND-type flash memory 26, an AT attachment (ATA) flash memory interface 27, an integrated device electronics (IDE) interface 28, a synchronous dynamic random access memory (SDRAM) 29, a SDRAM controller 30, an input unit 31, a general-purpose input-output unit 32, an embedded controller 33, a direct-current (DC)-direct-current (DC) converter 34, a battery 35 and a battery 36.

A bus interconnects the host CPU 11, the real-time processing CPU 12, the mask ROM 13, the signal processor 16, the memory controller 18, the serial interface 19, the graphic controller 21, the memory card interface 23, the controller 25, the IDE interface 28, the SDRAM controller 30 and the general-purpose input-output unit 32.

The host CPU 11, including one of an embedded CPU and a general-purpose CPU, executes an operating system and an application program. The host CPU 11 thus performs a GUI process on the digital still camera, thereby setting a size of an image size, a data compression rate of the image, and exposure and shutter speed on the digital still camera.

The real-time processing CPU 12, including one of an embedded CPU and a general-purpose CPU, executes an operating system and an application program independently of the host CPU 11. The real-time processing CPU 12 thus performs a real-time process, controlling each block of the digital still camera.

The mask ROM 13 stores data unique to the digital still camera and a boot loader to be executed by the host CPU 11 at startup.

The startup refers to not only a startup operation from a power interrupted state but also a startup operation from a suspension state, a hibernation state, or a soft-off state, i.e., a resume operation. The mask ROM 13 may store a secondary boot loader together with the boot loader.

The CCD 14 is an image sensor and connected to the analog front end 15. The CCD 14 outputs to the analog front end 15 an analog signal responsive to an image of a subject focused on a photo-sensitive unit by an optical system (not shown). A complementary metal-oxide semiconductor (CMOS) sensor may be substituted for the CCD 14.

The analog front end 15 is connected to each of the CCD 14 and the signal processor 16. The analog front end 15 performs predetermined processes such as a noise elimination process on the analog signal responsive to the image of the subject from the CCD 14, thereby converting the analog signal into a digital signal. The analog front end 15 then supplies the obtained digital signal of the image of the subject to the signal processor 16.

The signal processor 16 performs predetermined processes such as a white balance process and an encoding process on the digital signal of the image of the subject supplied from the analog front end 15. The signal processor 16 supplies the data of the image of the subject obtained as a result of a predetermined process to the NAND-type flash memory 26 via the bus, the IDE interface 28 and the ATA flash memory interface 27 or to the memory card 22 via the bus and the memory card interface 23.

The NAND-type flash memory 17, as one example of non-volatile memories, is connected to the memory controller 18. The NAND-type flash memory 17 stores a program to be executed by the host CPU 11 and data required for the host CPU 11 to perform the program. The NAND-type flash memory 17 also stores a program to be executed by the real-time processing CPU 12 and data required for the real-time processing CPU 12 to perform the program.

The NAND-type flash memory 17 stores an image at the moment the digital still camera is transitioned from the hibernation state to an operating state. The image recorded on the NAND-type flash memory 17 is data containing a program loaded on the SDRAM 29 and data with the digital still camera in operation. By loading the image from the NAND-type flash memory 17 to the SDRAM 29, the SDRAM 29 stores the program and data with the digital still camera in operation.

The image stored on the NAND-type flash memory 17 contains the program to be executed by the host CPU 11 and the data. Alternatively, the image stored on the NAND-type flash memory 17 may contain the program to be executed by the host CPU 11 and the related data and a program to be executed by the real-time processing CPU 12 and related data.

The image stored on the NAND-type flash memory 17 may also be referred to as a warm boot image.

The memory controller 18 controls a read operation to read the program and the data or the warm boot image from the NAND-type flash memory 17. The memory controller 18 controls a write operation to write a variety of data such as a warm boot image onto the NAND-type flash memory 17.

The serial interface 19 performs serial communications between the host CPU 11 and the embedded controller 33.

The LCD 20 displays a variety of images and text under the control of the connected graphic controller 21. The graphic controller 21 controls a displaying operation of the graphic controller 21.

The memory card 22 includes a non-volatile memory medium, such as a Memory Stick (Registered Trademark), and is detachably mounted onto the digital still camera. When loaded onto the digital still camera, the memory card 22 is electrically connected to the memory card interface 23. The memory card interface 23 controls storage of data onto the loaded memory card 22 and reading of data from the loaded memory card 22.

The wireless LAN interface 24, in compliance with the Institute of Electrical and Electronic Engineers (IEEE) Standards 802.11a, 11b or 11g, communicates with an access point or another device. The controller 25, connected to the wireless LAN interface 24 and the bus, controls the wireless LAN interface 24.

The NAND-type flash memory 26 is a non-volatile storage medium and under the control of the ATA flash memory interface 27 stores a variety of data such as data of the image. The ATA flash memory interface 27 serves as an interface between the IDE interface 28 and the NAND-type flash memory 26 and communicates with the IDE interface 28 in accordance with the ATA standard. The IDE interface 28 communicates with the ATA flash memory interface 27. Since the NAND-type flash memory 26 is connected to the bus via the ATA flash memory interface 27 and the IDE interface 28, the host CPU 11 can control the NAND-type flash memory 26 using a command complying with the IDE standard intended for one of a hard disk and an optical disk drive.

The SDRAM 29, as one example of recording media, is connected to the SDRAM controller 30. The SDRAM 29 stores the operating system and application program to be executed by the host CPU 11 and the operating system and application program to be executed by the real-time processing CPU 12. The host CPU 11 executes the operating system and the application program stored on the SDRAM 29. The real-time processing CPU 12 executes the operating system and the application program stored on the SDRAM 29.

The SDRAM 29 has a self-refresh function to refresh data (containing the program) stored thereon with power supplied thereto.

The SDRAM controller 30 controls a write operation to write the program and the data onto the SDRAM 29 and a read operation to read the program and the data from the SDRAM 29.

The input unit 31 includes a power button, a wireless LAN button, a universal serial bus (USB) button, a switch for opening and closing a lens cap (lens shutter), cross keys, a touchpanel, etc. The input unit 31 supplies to the general-purpose input-output unit 32 and the embedded controller 33 a signal responsive to pressing operations of the power button, the wireless LAN button and the USB button, a signal responsive to opening and closing operations of the lens cap, and a signal responsive to operations of the cross keys and the touchpanel.

The general-purpose input-output unit 32 serves as a serial or parallel general-purpose input-output interface. The general-purpose input-output unit 32 supplies to one of the host CPU 11 and the real-time processing CPU 12 data of the signal responsive to the operations of the power button, the wireless LAN button and the USB button, the signal responsive to the opening and closing operations of the lens cap, and the signal responsive to the operations of the cross keys and the touchpanel.

The general-purpose input-output unit 32 includes a USB connection terminal 41 for connection with one of a USB device and a USB cable.

If one end of a cable (not shown) is connected to a device such as a personal computer with the other end connected to the USB connection terminal 41, the general-purpose input-output unit 32 supplies the embedded controller 33 with a signal indicating that the USB connection terminal 41 is connected the device.

The embedded controller 33 as an embedded CPU executes the program stored on the internal ROM or the internal RAM. The embedded controller 33 includes a real-time clock for time counting. In response to a signal supplied from the input unit 31, the embedded controller 33 controls resetting of the host CPU 11 and clearing the reset state on the host CPU 11 in response to the signal supplied from the input unit 31 when one of the power button, the wireless LAN button and the USB button is pressed, or when the lens cap is opened or closed.

The embedded controller 33 controls supplying of power from the DC-DC converter 34 to each block of the digital still camera.

The DC-DC converter 34 converts power supplied from the battery 35 as a DC voltage power supply or an external power supply and supplies or stops supplying power at a predetermined voltage to each block in the digital still camera under the control of the embedded controller 33.

The battery 35 is a secondary battery detachably mounted on the digital still camera. The battery 35 supplies power to the digital still camera via the DC-DC converter 34.

The battery 36 is a primary battery such as a button battery. When power is not supplied from the external power supply or the battery 35, the battery 36 supplies power to the embedded controller 33.

The program to be executed by the host CPU 11, the program to be executed by the real-time processing CPU 12 and the program to be executed by the embedded controller 33 are described below.

In the discussion that follows, it is sometimes described that a particular process is executed by a particular program, but such a language is intended to describe that a particular process is executed by a corresponding computer.

Figure 2:
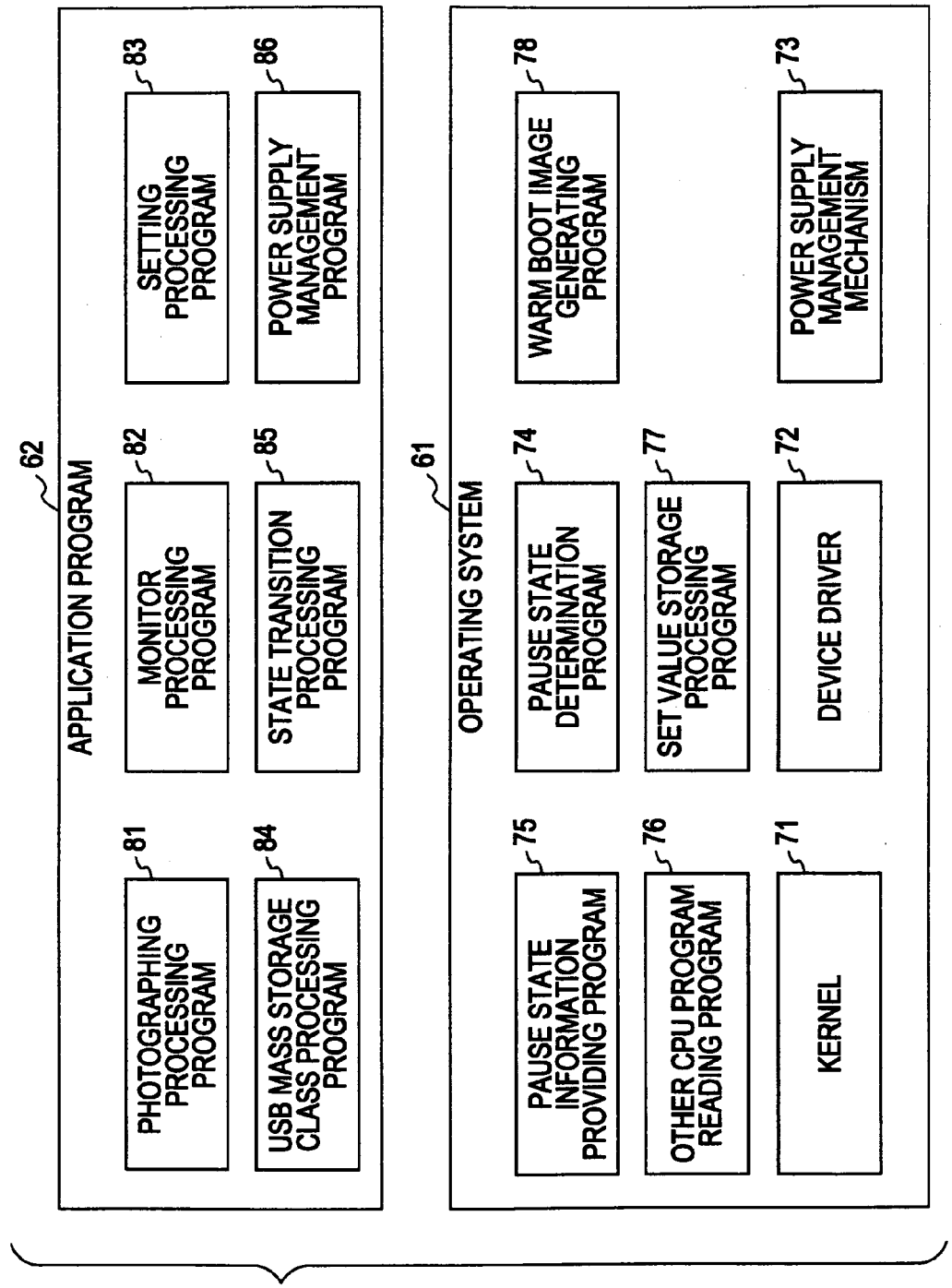
FIG. 2 is a block diagram illustrating an operating system and an application program executed by a host CPU.

With reference to FIG. 2, an operating system 61 and an application program 62 to be executed by the host CPU 11 are described below.

The host CPU 11 executes the operating system 61 and the application program 62.

The operating system 61 is a Linux® operating system, for example and performs a basic process such as software management. The application program 62 displays an image of a subject to be photographed and monitors the photographed image.

The operating system 61 includes a kernel 71, a device driver 72, a power supply management mechanism 73, a pause state determination program 74, a pause state information providing program 75, an other CPU program reading program 76, a set value storage processing program 77 and a warm boot image generating program 78.

The kernel 71, serving as a core of the operating system 61, monitors the application program 62 and devices such as the mask ROM 13 through the general-purpose input-output unit 32, manages resources such as the SDRAM 29, the memory card 22 and the NAND-type flash memory 26, and performs interrupt processes and inter-process communications.

The device driver 72 controls devices including the signal processor 16, the serial interface 19, the graphic controller 21, the memory card interface 23, the controller 25, the IDE interface 28 and the general-purpose input-output unit 32. The device driver 72 individually controls the signal processor 16 through the general-purpose input-output unit 32. In the following discussion, however, the device driver 72 is described as a driver that generally controls the signal processor 16 through the general-purpose input-output unit 32 without discriminating one element from another.

The power supply management mechanism 73, as an advanced configuration and power interface (ACPI) sub system, manages power to cause the digital still camera to pause in one of a suspension state, a hibernation state and a soft-off state or to cause the digital still camera to transition from the pause state of the suspension state, the hibernation state and the soft-off state to an operating state.

When the digital still camera is set to pause, the pause state determination program 74 determines whether the digital still camera is in one of the suspension state and the hibernation state.

When the digital still camera is set to pause, the pause state information providing program 75 supplies to the embedded controller 33 via the serial interface 19 pause state information indicating whether the digital still camera is in either the suspension state or the hibernation state.

When the digital still camera is set to pause, the other CPU program reading program 76 loads the operating system and the application program stored on the NAND-type flash memory 17 onto the SDRAM 29.

An action of reading the program or data from the NAND-type flash memory 17 and storing the read program or data onto the SDRAM 29 is referred to as "loading the program or data from the NAND-type flash memory 17 to the SDRAM 29."

When the digital still camera is set to pause, the set value storage processing program 77 stores onto the NAND-type flash memory 17 data required to start up the digital still camera subsequent to the pause period. The required data may contain the shutter speed, exposure, the size of the image zoomed or photographed, the compression rate in the encoding process, and set values such as register values in the host CPU 11.

When a firmware, such as one of the operating system 61 and the application program 62, is updated and the digital still camera starts from a power-off state, the warm boot image generating program 78 generates a warm boot image immediately subsequent to startup. The warm boot image generating program 78 causes the NAND-type flash memory 17 to store the generated warm boot image.

The application program 62 includes a photographing processing program 81, a monitor processing program 82, a setting processing program 83, a USB mass storage class processing program 84, a state transition processing program 85 and a power supply management program 86.

The photographing processing program 81 controls displaying of an image of a subject to be photographed onto the LCD 20, image processing of a photographed image, and encoding and storage of data of the photographed image. The photographing processing program 81 thus performs a photographing process.

The monitor processing program 82 allows a user to view an image by displaying on the LCD 20 data of an image photographed and stored on one of the NAND-type flash memory 26 and the memory card 22.

The setting processing program 83 performs a variety of setting processes for shutter speed, exposure, a size of an image to be zoomed or photographed, an encoding method, a compression rate in an encoding process, a storage destination of image data and a manner of displaying an image in a viewing operation.

When a cable is used with one end connected to a device such as a personal computer and with the other end connected to the USB connection terminal 41, the USB mass storage class processing program 84 performs a USB mass storage class process to cause the digital still camera to operate as a recording device.

Each of the photographing processing program 81 through the USB mass storage class processing program 84 performs a GUI process required for each of the photographing process through the USB mass storage class process.

The state transition processing program 85 performs a state transition process to transition the digital still camera to one of the plurality of operating states. The operating state will be described later.

The power supply management program 86 serves as an interface for managing power provided by the kernel 71, and issues a variety of commands relating to states of power supply.

The operating system 61 may include the state transition processing program 85.

Figure 3:
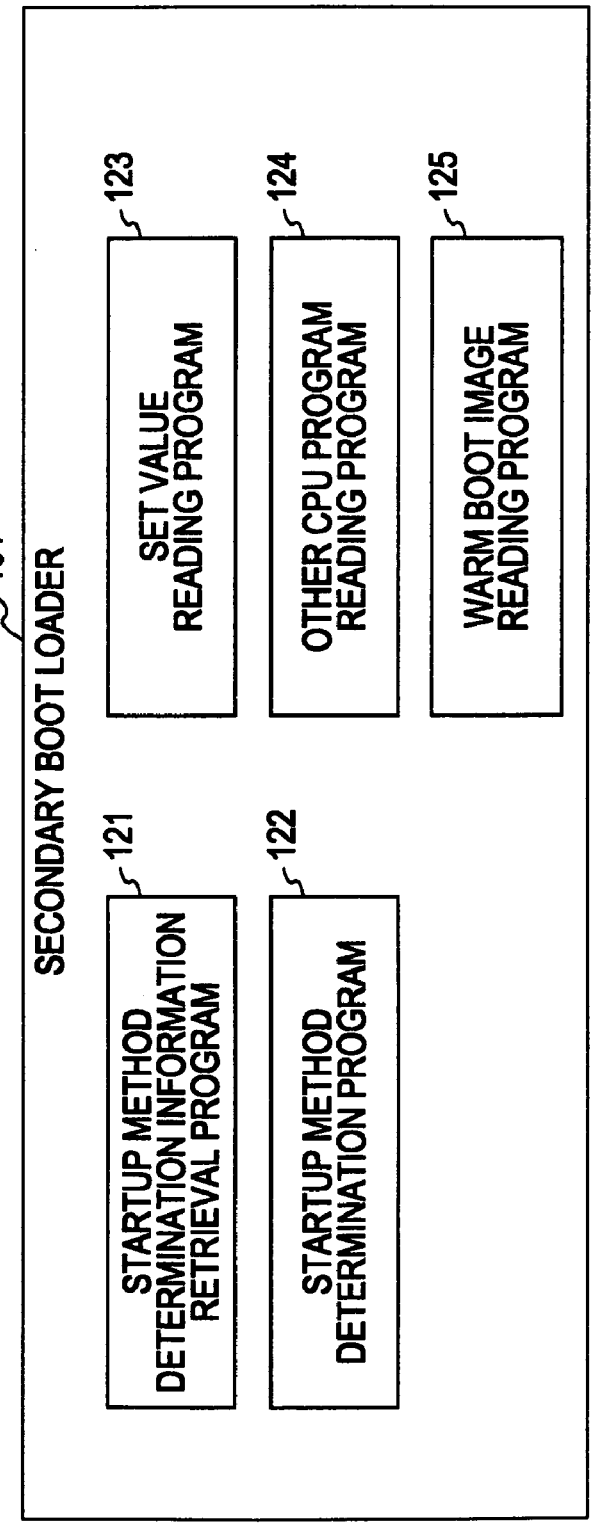
FIG. 3 is a block diagram illustrating a secondary boot loader executed by the host CPU.

A second boot loader 101 to be executed by the host CPU 11 at the startup is described below with reference to FIG. 3. At the startup, the second boot loader is loaded onto the SDRAM 29 by the boot loader executed by the host CPU 11 and is then executed.

The secondary boot loader 101 corresponds a program grub or lilo used in the personal computer and controls the startup of the operating system 61 and the application program 62.

The secondary boot loader 101 includes a startup method determination information retrieval program 121, a startup method determination program 122, a set value reading program 123, an other CPU program reading program 124 and a warm boot image reading program 125.

The startup method determination information retrieval program 121 retrieves startup method determination information stored on an internal memory of the embedded controller 33. The startup method determination information determines the startup method.

The startup methods include a plurality of methods. In one startup method, the digital still camera may be started by executing a program that is stored on the SDRAM 29 in the suspension state and was also stored on the SDRAM 29 in the operating state immediately prior to the pause. In the other startup method, the digital still camera may be started by loading onto the SDRAM 29 the warm boot image, which was stored on the SDRAM 29 in the operating state prior to the pause, from the NAND-type flash memory 17 and executing the warm boot image.

The startup method that is performed by executing the program that is stored on the SDRAM 29 in the suspension state and was also stored on the SDRAM 29 in the operating state immediately prior to the pause is referred to as a hot boot. The startup method that is performed by loading onto the SDRAM 29 the warm boot image, which was stored on the SDRAM 29 in the operating state prior to the pause, from the NAND-type flash memory 17 and executing the warm boot image is referred to as a warm boot.

The startup method that is performed by opening and starting a file of an operating system stored on the NAND-type flash memory 17 is referred to as a cold boot.

Time required to start the digital still camera in the warm boot is longer than time required to start the digital still camera in the hot start, and time required to start the digital still camera in the cold boot is substantially longer time required to start the digital still camera in the warm boot. More specifically, the startup in the hot boot is substantially quicker than the startup in the cold boot, the startup in the warm boot is quicker than the startup in the cold boot, and the startup in the hot boot is quicker than the startup in the warm boot.

The startup in the hot boot and the warm boot is generally referred to as "resume."

The hot boot, the warm boot and the cold boot handle one of the digital still camera, the host CPU 11 and the operating system 61. In other words, the digital still camera may be started in one of the hot boot, the warm boot and the cold boot, the host CPU 11 may be started in one of the hot boot, the warm boot and the cold boot and the operating system 61 may be started in one of the hot boot, the warm boot and the cold boot.

The startup method determination information is described below. The startup method determination information includes pause state information, battery loading information and startup trigger information.

The pause state information indicates a pause state determined when the digital still camera is to pause. The pause state information contains an image generation flag. A image generation flag, if set, indicates that the warm boot image is to be generated, and a image generation flag, if cleared, indicates that the warm boot image is not to be generated.

The battery loading information indicates history of loading of the battery 35 in the pause state.

The startup trigger information indicates a cause of trigger, for example, the pressing of one of the power button, the wireless LAN button and the USB button on the input unit 31, the connection of a device to the USB connection terminal 41, and the opening of the lens cap.

The startup method determination information retrieval program 121 stores the startup method determination information retrieved from the embedded controller 33 on a predetermined storage area on the SDRAM 29.

The startup method determination program 122 determines the startup method based on the startup method determination information.

When the digital still camera is set to pause, the set value reading program 123 reads a set value that has been stored on the NAND-type flash memory 17 by the set value storage processing program 77.

In the warm boot or the cold boot, the other CPU program reading program 124 loads onto the SDRAM 29 the operating system and the application program of the real-time processing CPU 12 stored on the NAND-type flash memory 17.

In the warm boot, the warm boot image reading program 125 loads onto the SDRAM 29 the warm boot image from the NAND-type flash memory 17.

Figure 4:
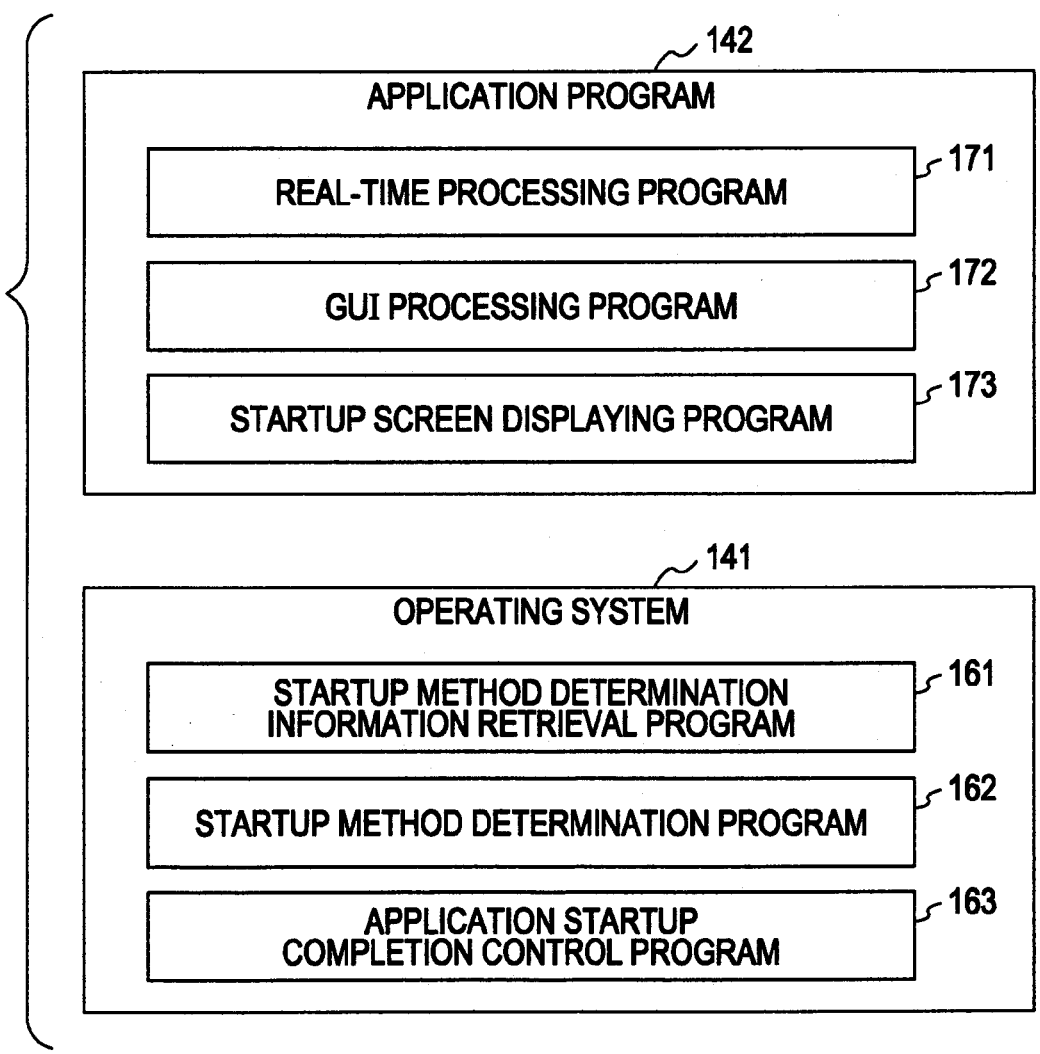
FIG. 4 is a block diagram illustrating an operating system and an application program executed by a real-time processing CPU.

An operating system 141 and an application program 142, both to be executed by the real-time processing CPU 12, are described below with reference to a flowchart of FIG. 4.

The real-time processing CPU 12 executes the operating system 141 and the application program 142.

The operating system 141 is a real-time operating system such as CITRON and performs a variety of basic processes. The application program 142 performs real-time control processes on an optical system (not shown) used to photograph a subject, the CCD 14, the analog front end 15 and the signal processor 16.

The operating system 141 includes a startup method determination information retrieval program 161, a startup method determination program 162 and an application startup completion control program 163.

In the startup operation, the startup method determination information retrieval program 161 retrieves the startup method determination information by reading the startup method determination information that has been stored on the predetermined storage area of the SDRAM 29 by the startup method determination information retrieval program 121.

The startup method determination program 162 determines the startup method based on the startup method determination information, which is the same as the one used by the startup method determination program 122. The startup method determined by the startup method determination program 162 is thus the same as the one determined by the startup method determination program 122.

In the startup operation, the application startup completion control program 163 controls the startup and ending of a variety processes of the application program 142 based on the startup trigger information contained in the startup method determination information.

The application program 142 includes a real-time processing program 171, a GUI processing program 172 and a startup screen displaying program 173.

The real-time processing program 171 controls the optical system (not shown), the CCD 14, the analog front end 15 and the signal processor 16 on a real-time basis.

The GUI processing program 172 performs a user interface process to acquire a command from a user from the input unit 31 that is shared by the real-time processing CPU 12 and the host CPU 11. The GUI processing program 172 performs part of a GUI process performed by the photographing processing program 81 through the USB mass storage class processing program 84, more specifically performs a GUI process, limited to setting of values requested to be set immediately subsequent to the startup, such as setting of a shutter speed, exposure and zoom.

In the startup operation, the startup screen displaying program 173 causes the LCD 20 to display a startup screen showing startup.

The application program 142 may include the application startup completion control program 163.

Figure 5:
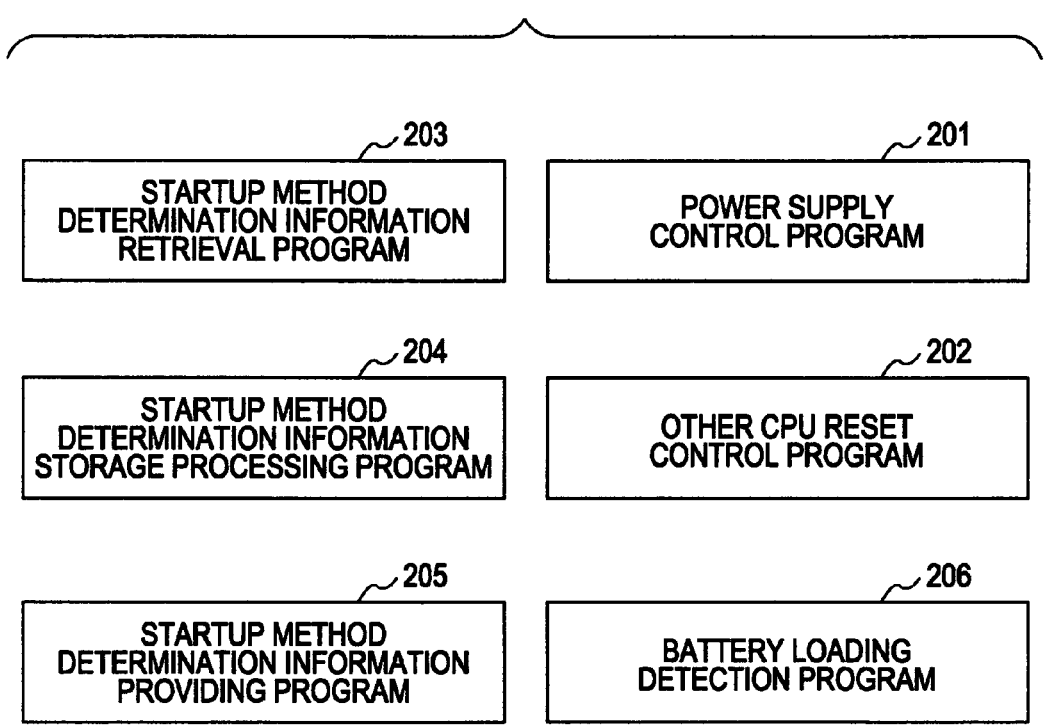
FIG. 5 is a block diagram illustrating a process executed by an embedded controller.

Programs to be executed by the embedded controller 33 are described below. FIG. 5 illustrates the programs to be executed by the embedded controller 33. The embedded controller 33 includes a power supply control program 201, other CPU reset control program 202, a startup method determination information retrieval program 203, a startup method determination information storage processing program 204, a startup method determination information providing program 205, and a battery loading detection program 206.

The power supply control program 201 controls the DC-DC converter 34, thereby controlling supplying of power to each block of the digital still camera.

The other CPU reset control program 202 controls resetting of the host CPU 11 and clearing a reset state on the host CPU 11.

The startup method determination information retrieval program 203 retrieves the startup method determination information.

When the digital still camera is set to pause, the startup method determination information retrieval program 203 retrieves the pause state information of the startup method determination information by receiving the pause state information transmitted from the pause state information providing program 75.

The startup method determination information retrieval program 203 acquires from the battery loading detection program 206 detection results relating to the loading of the battery 35. The startup method determination information retrieval program 203 generates the battery loading information responsive to the detection results relating to the loading of the battery 35. The startup method determination information retrieval program 203 generates the startup trigger information indicating the pressing of one of the power button, the wireless LAN button and the USB button or the opening of the lens cap in response to the signal supplied from the input unit 31. The signal supplied from the input unit 31 is generated in response to the pressing of one of the power button, the wireless LAN button and the USB button or the opening of the lens cap.

The startup method determination information storage processing program 204 stores the acquired startup method determination information on an internal memory of the embedded controller 33. The startup method determination information storage processing program 204 stores the received pause state information, the generated battery loading information or the generated startup trigger information on the internal memory of the embedded controller 33.

In response to a request from the host CPU 11, the startup method determination information providing program 205 supplies the startup method determination information from the internal memory of the embedded controller 33 to the host CPU 11 via the serial interface 19.

The battery loading detection program 206 detects an output voltage of the DC-DC converter 34, thereby detecting the loading of the battery 35.

Figure 6:
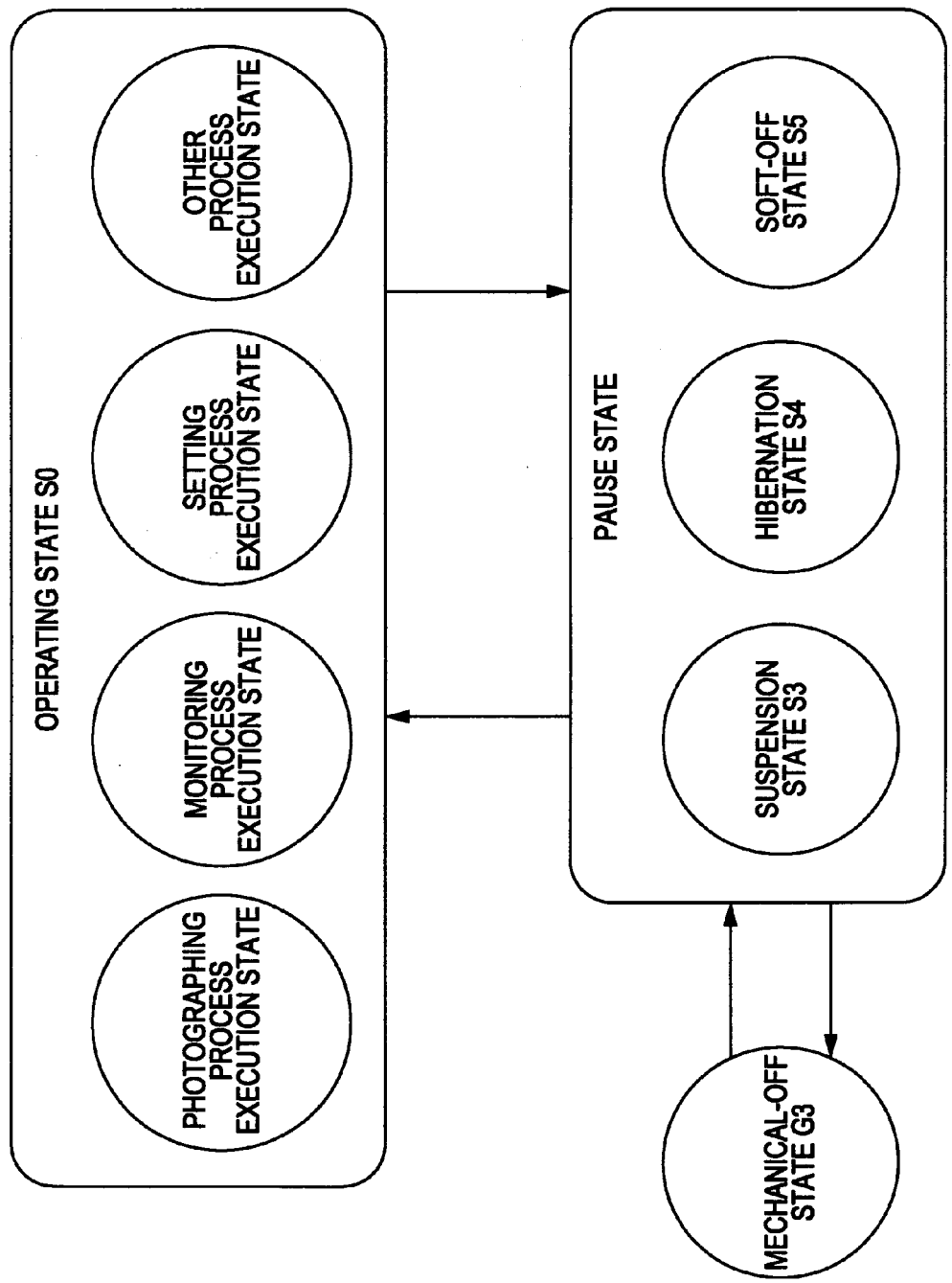
FIG. 6 illustrates states of the digital still camera.

The states of the digital still camera are described below with reference to FIGS. 6 through 9. As shown in FIG. 6, the digital still camera takes one of a mechanical-off state G3, a suspension state S3, a hibernation state S4, a soft-off state S5, a photographing process execution state, a monitoring process execution state, a setting process execution state and other process execution state.

In the photographing process execution state, the host CPU 11 performs the photographing processing program 81. In the monitoring process execution state, the host CPU 11 performs the monitor processing program 82. In the setting process execution state, the host CPU 11 performs the setting processing program 83.

In the other process execution state, the host CPU 11 performs the USB mass storage class processing program 84. Also in the other process execution state, the host CPU 11 performs the application program 62 but performs none of the photographing processing program 81, the monitor processing program 82, the setting processing program 83 and the USB mass storage class processing program 84.

Each of the suspension state S3, the hibernation state S4 and the soft-off state S5 is also referred to as a pause state. Each of the photographing process execution state, the monitoring process execution state, the setting process execution state and the other process execution state is referred to as an operating state S0.

FIG. 7 illustrates whether each of the host CPU 11, the SDRAM 29 and the embedded controller 33 is supplied with power in each of the operating state S0, the suspension state S3, the hibernation state S4, the soft-off state S5 and the mechanical-off state G3.

The label "ON" in FIG. 7 indicates that power is supplied while the label "OFF" in FIG. 7 indicates that no power is supplied.

In the operating state S0, the DC-DC converter 34 powers all of the host CPU 11, the SDRAM 29 and the embedded controller 33.

In the suspension state S3, the DC-DC converter 34 powers the SDRAM 29 and the embedded controller 33 while stopping powering the host CPU 11. The SDRAM 29 refreshes the data (program) stored thereon with the self-refresh function thereof while being powered. The SDRAM 29 thus continuously stores the program and data in the suspension state S3.

In each of the hibernation state S4 and the soft-off state S5, the DC-DC converter 34 powers the embedded controller 33 while stopping powering the host CPU 11 and the SDRAM 29.

The digital still camera electrically operates in the same manner regardless of whether it is in the hibernation state S4 or the soft-off state S5, and the hibernation state S4 and the soft-off state S5 are not discriminated in the following discussion.

In the mechanical-off state G3, the DC-DC converter 34 stops powering the host CPU 11, the SDRAM 29 and the embedded controller 33. However, the embedded controller 33 is still powered from the battery 36. The embedded controller 33 keeps the internal real-time clock (RTC) thereof operative.

The real-time processing CPU 12 and the host CPU 11 are powered in the operating state S0 but are not powered in each of the suspension state S3, the hibernation state S4, the soft-off state S5 and the mechanical-off state G3.

Figure 8:
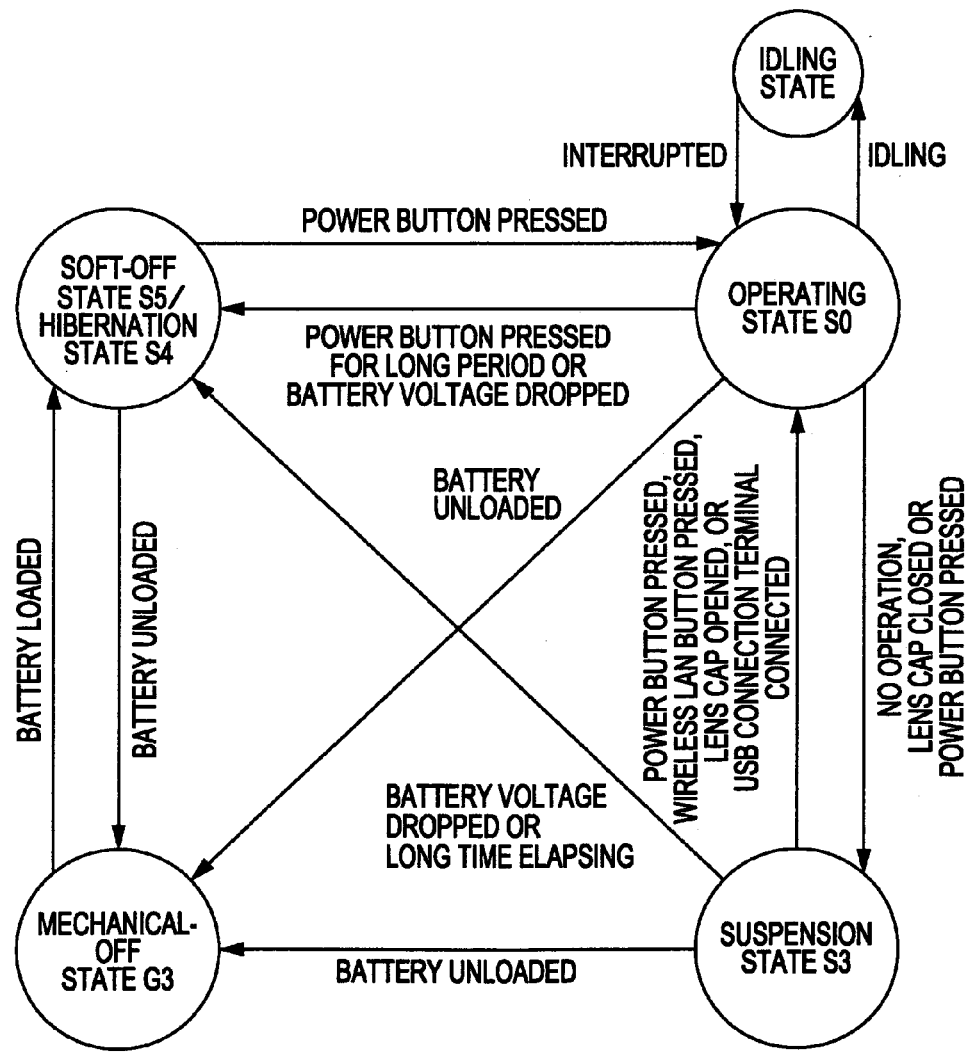
FIG. 8 illustrates state transition of the digital still camera.

FIG. 8 illustrates state transition. The digital still camera is transitioned to the hibernation state S4 (soft-off state S5) when the battery 35 is loaded in the mechanical-off state G3.

If the battery 35 is unloaded in the hibernation state S4 (soft-off state S5), the digital still camera is transitioned to the mechanical-off state G3.

If the power button is pressed on the input unit 31 in the hibernation state S4 (soft-off state S5), the digital still camera is transitioned to the operating state S0. If the power button is pressed for a period of time longer than a predetermined time in the operating state S0, the digital still camera is transitioned to the hibernation state S4 (soft-off state S5).

The digital still camera is transitioned to the suspension state S3 if the power button is pressed in the operating state S0, if the lens cap is closed in the operating state S0, or if the user performs no operation in the operating state S0 for a period of time longer than a predetermined time.

The digital still camera is transitioned to the operating state S0 if the power button is pressed in the suspension state S3, if the wireless LAN button is pressed on the input unit 31 in the suspension state S3, if the lens cap is opened in the suspension state S3, or if one end of the cable with the other end connected to another device is connected to the USB connection terminal 41 in the suspension state S3.

The digital still camera is transitioned to the hibernation state S4 (soft-off state S5) if the voltage of the battery 35 drops below a predetermined threshold value with no external power applied in the suspension state S3 or if a predetermined time has elapsed since the transition to the suspension state S3.

The digital still camera is transitioned to the mechanical-off state G3 if the battery 35 is unloaded in the suspension state S3. Similarly, the digital still camera is transitioned to the mechanical-off state G3 if the battery 35 is unloaded in the operating state S0.

If no process is performed for a predetermined period of time in the operating state S0, the digital still camera is transitioned to an idling state with a clock frequency lowered in the host CPU 11. In the idling state, the digital still camera is transitioned to the operating state S0 at regular intervals in response to regular interrupt inputs.

Figure 9:
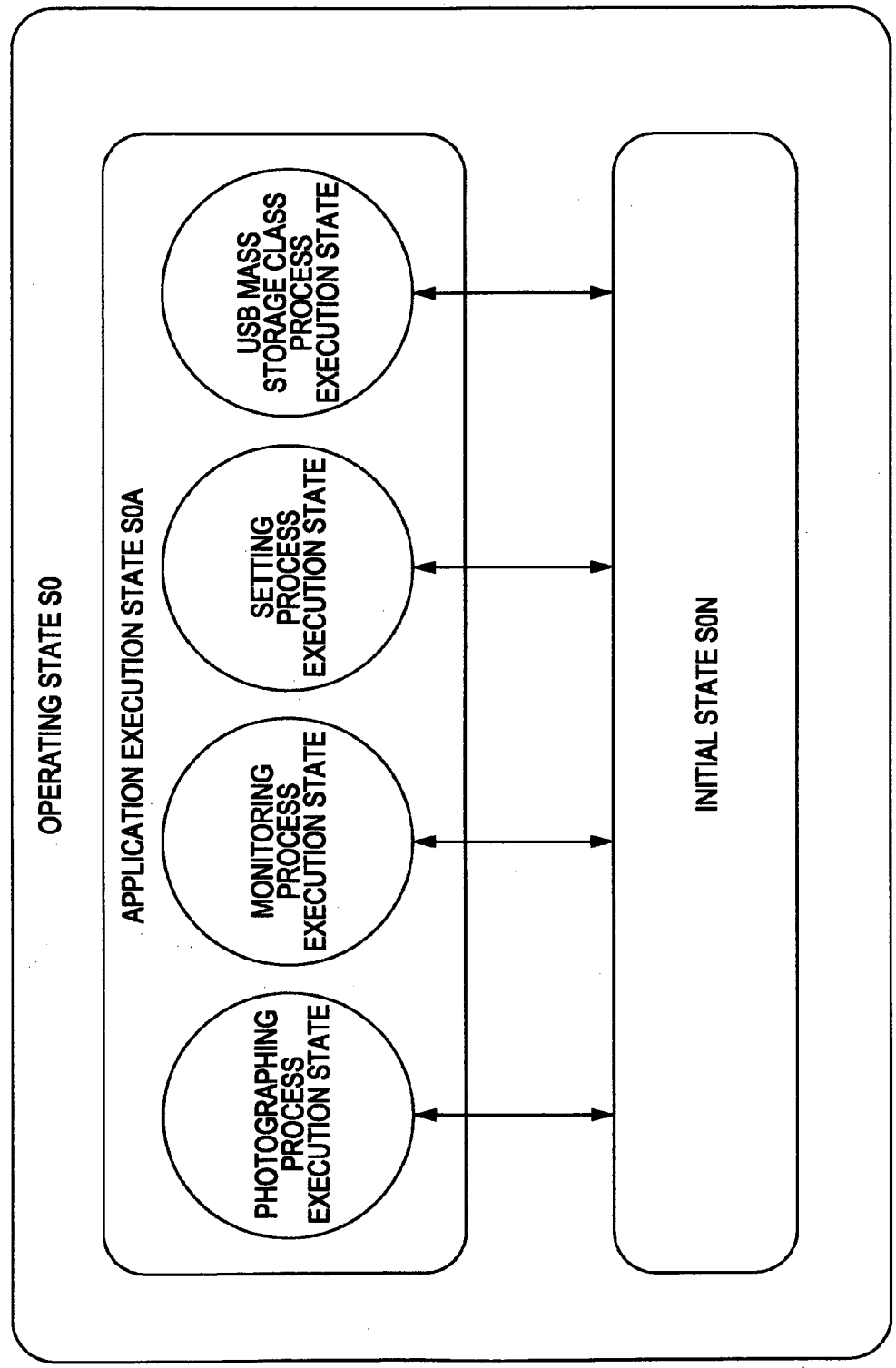
FIG. 9 illustrates states of the digital still camera.

The operating state S0 is described in detail with reference to FIG. 9. The operating states S0 include a photographing process execution state, a monitoring process execution state, a setting process execution state, other process execution state, a USB mass storage class process execution state and an initial state SON.

In the USB mass storage class process execution state, the host CPU 11 performs the USB mass storage class processing program 84.

In the initial state SON, the execution of an application is controlled. In the initial state SON, the host CPU 11 performs the application program 62 but performs none of the photographing processing program 81, the monitor processing program 82, the setting processing program 83 and the USB mass storage class processing program 84.

The digital still camera can be transitioned from the initial state SON to an application execution state SOA of any of the photographing process execution state, the monitoring process execution state, the setting process execution state and the USB mass storage class process execution state. Conversely, the digital still camera is transitioned to the initial state SON from any of the photographing process execution state, the monitoring process execution state, the setting process execution state and the USB mass storage class process execution state.

The digital still camera cannot be directly transitioned from the photographing process execution state to any of the monitoring process execution state, the setting process execution state and the USB mass storage class process execution state and cannot be directly transitioned from the monitoring process execution state to any of the photographing process execution state, the setting process execution state and the USB mass storage class process execution state. Similarly, the digital still camera cannot be directly transitioned from the setting process execution state to any of the photographing process execution state, the monitoring process execution state and the USB mass storage class process execution state and cannot be directly transitioned from the USB mass storage class process execution state to any of the photographing process execution state, the monitoring process execution state and the setting process execution state.

More specifically, no direct transition is permitted between the photographing process execution state, the monitoring process execution state, the setting process execution state and the USB mass storage class process execution state.

Figure 10:
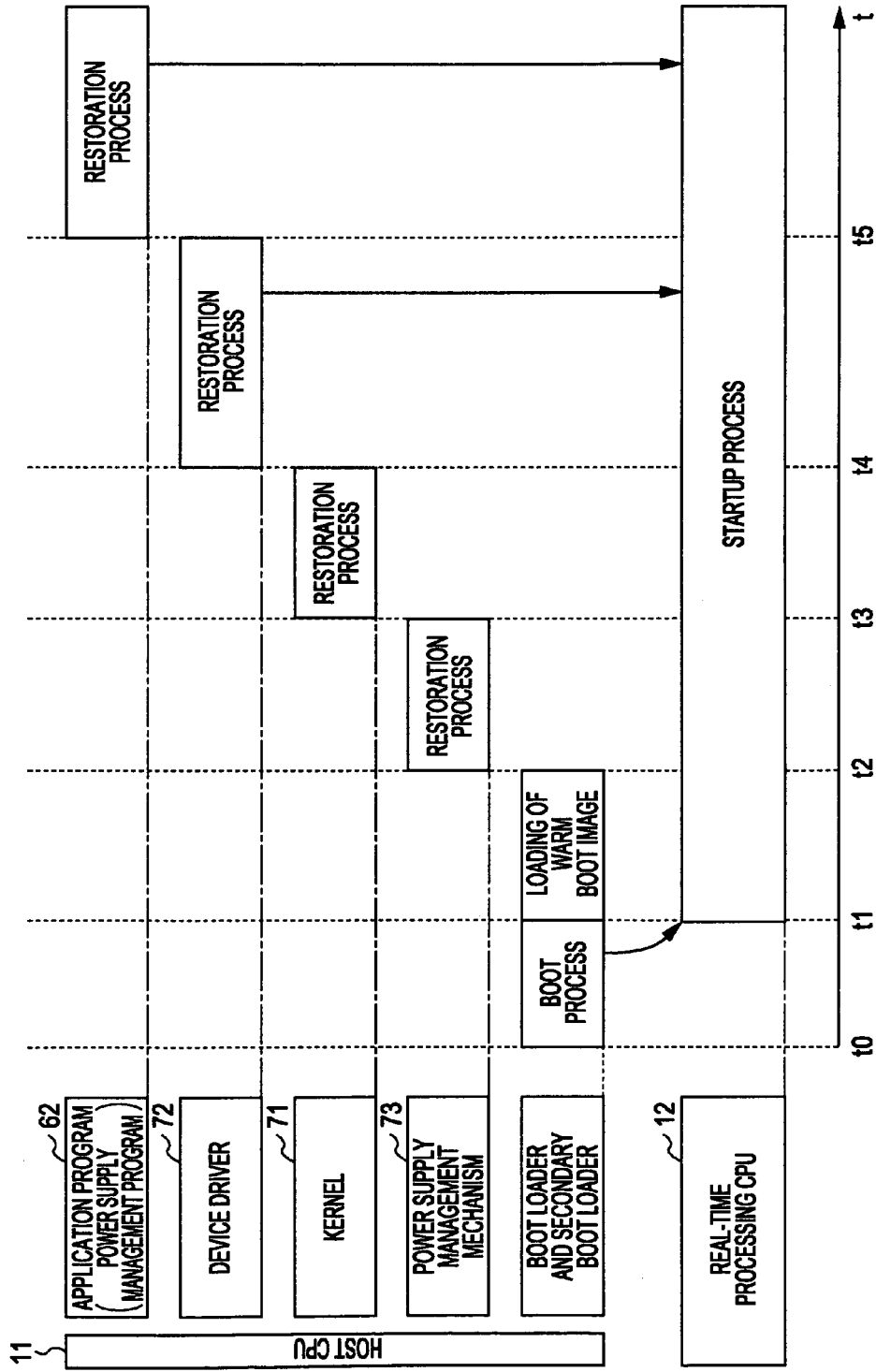
FIG. 10 illustrates a summary of a startup process of a warm boot.
Figure 11:
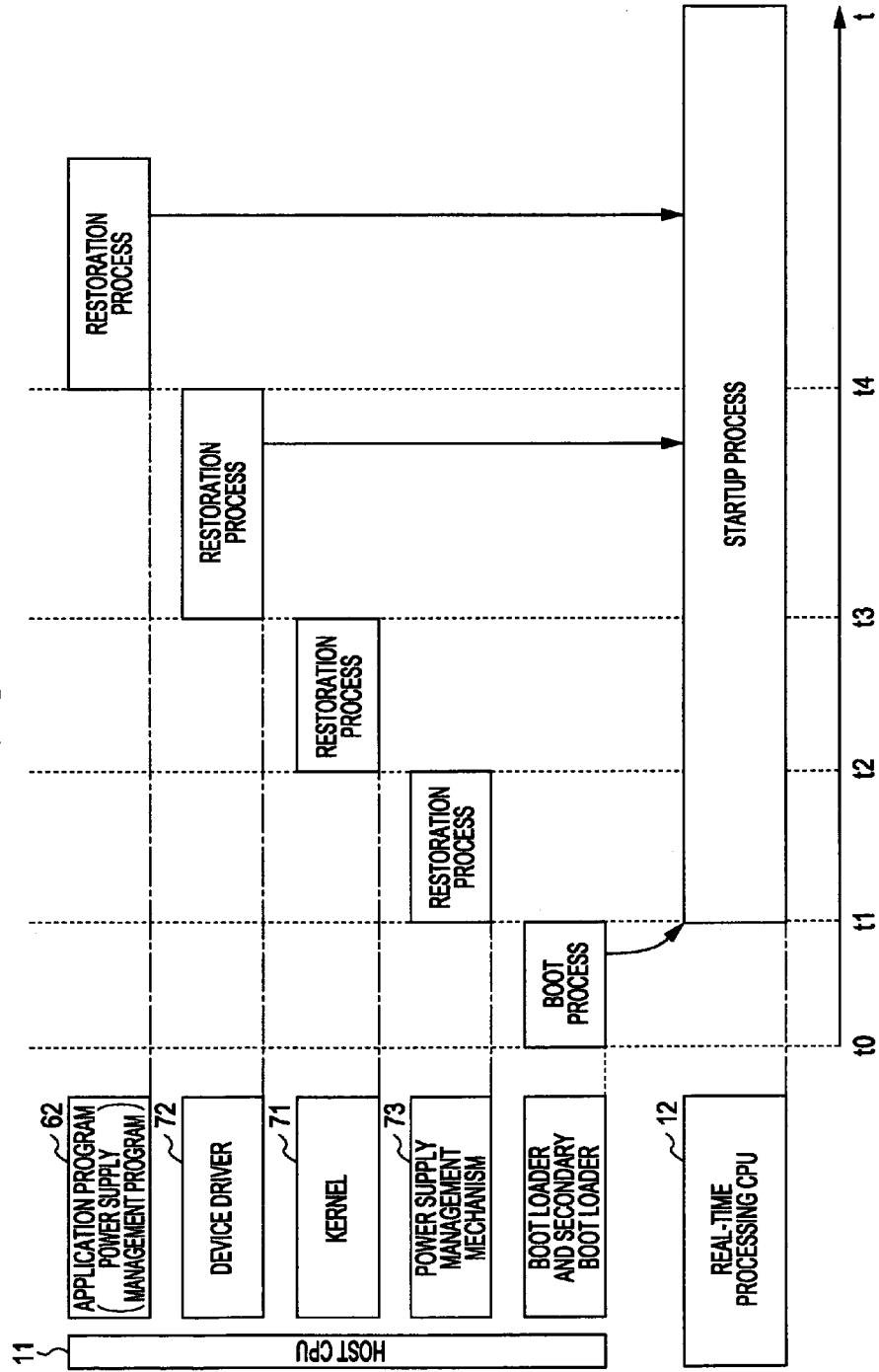
FIG. 11 illustrates a summary of a startup process of a hot boot.
Figure 12:
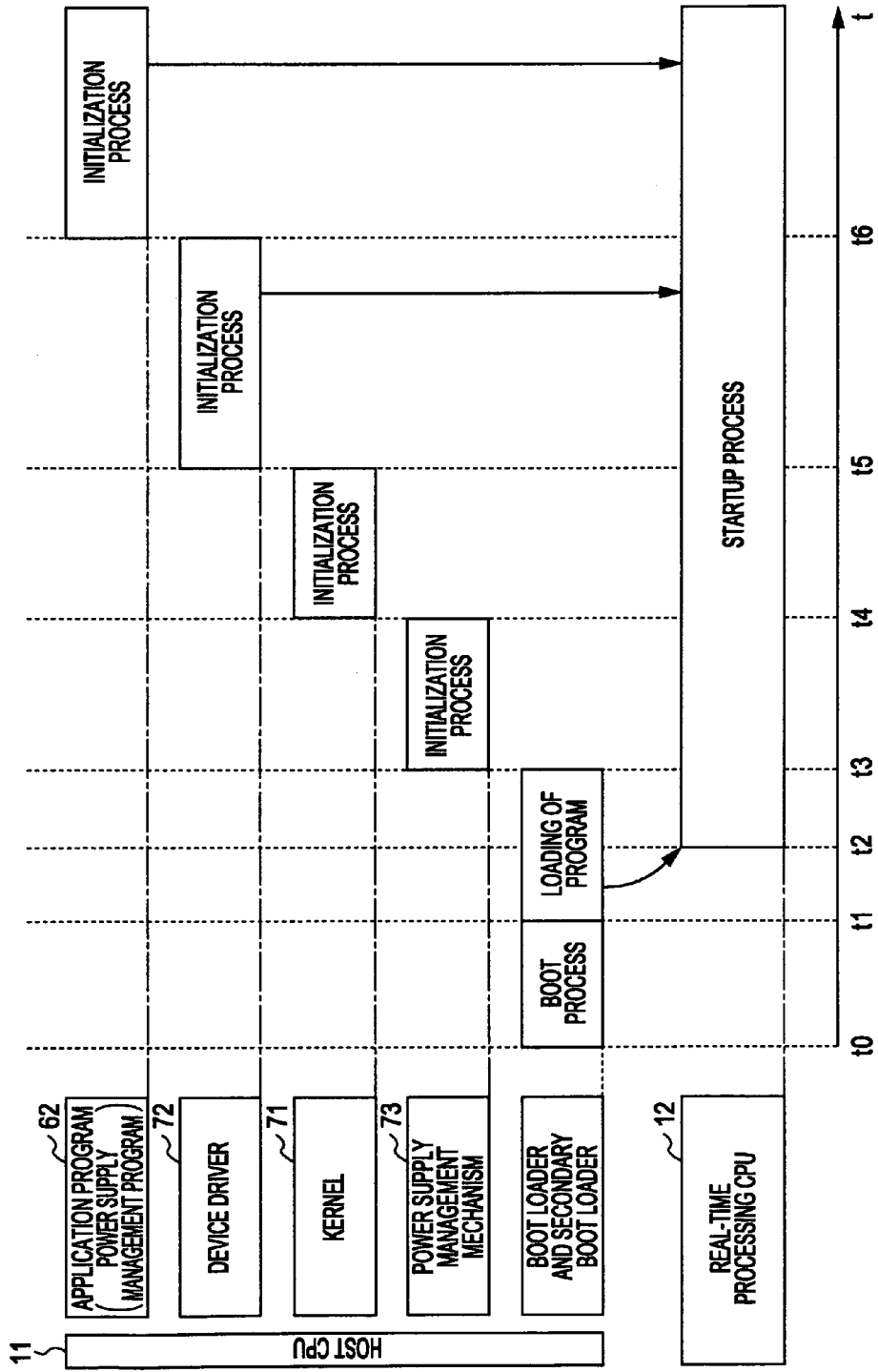
FIG. 12 illustrates a summary of a startup process of a cold boot.

The startup process is summarized with reference to FIGS. 10 through 12.

The warm boot startup is described below. The warm boot is started by loading the warm boot image, once stored on the SDRAM 29 in the operating state S0 prior to the pause, from the NAND-type flash memory 17 to the SDRAM 29.

FIG. 10 illustrates a warm boot startup procedure. At time t0, the resetting of the host CPU 11 is cleared. The host CPU 11 starts executing the boot loader stored at a predetermined address of the mask ROM 13. The host CPU 11 for executing the boot loader loads the second boot loader from the NAND-type flash memory 17 to the SDRAM 29. In response to a jump command of the boot loader, the host CPU 11 starts executing the second boot loader.

The host CPU 11 going to execute the second boot loader loads the operating system 141 and application program 142 to be executed by the real-time processing CPU 12 from the NAND-type flash memory 17 to the SDRAM 29.

The host CPU 11 going to execute the second boot loader clears the resetting of the real-time processing CPU 12.

The real-time processing CPU 12 with the reset state thereof cleared starts executing the program with a predetermined address of the SDRAM 29, thereby starting the operating system 141 at time t1.

The host CPU 11 going to execute the second boot loader loads the warm boot image from the NAND-type flash memory 17 to the SDRAM 29.

Upon loading the warm boot image onto the SDRAM 29, the host CPU 11 starts executing the power supply management mechanism 73 contained in the loaded warm boot image at time t2. The host CPU 11 for executing the power supply management mechanism 73 performs a restoration process by detecting states of power supplies including the DC-DC converter 34 and the battery 35 and by modifying an internal parameter in response to the detected power state.

In succession to the restoration process of the power supply management mechanism 73, the host CPU 11 starts executing the kernel 71 contained in the loaded warm boot image at time t3. The host CPU 11 for executing the kernel 71 performs a restoration process by detecting the availability state of memory space in the SDRAM 29 and modifying parameters of a process of managing resources such as the SDRAM 29.

In succession to the restoration process of the kernel 71, the host CPU 11 performs a restoration process of the device driver 72 contained in the loaded warm boot image at time t4. More specifically, the host CPU 11 performs the restoration process by detecting device states of the signal processor 16, the serial interface 19, the graphic controller 21, the memory card interface 23, the controller 25, the IDE interface 28 and the general-purpose input-output unit 32 and modifying parameters of the device driver 72 in accordance with the detected device states.

In succession to the restoration process of the device driver 72, the host CPU 11 notifies the real-time processing CPU 12 of the completion of the restoration process of the device driver 72.

Upon receiving the notification of the completion of the restoration process of the device driver 72 from the host CPU 11, the real-time processing CPU 12 performs a real-time control process by performing the real-time processing program 171 and starts communicating with the host CPU 11.

In succession to the restoration process of the device driver 72, the host CPU 11 starts a restoration process of the application program 62 contained in the loaded warm boot image at time t5. The host CPU 11 performs the restoration process of the application program 62 by setting values for the shutter speed, exposure, and zooming.

In succession to the restoration process of the application program 62, the host CPU 11 notifies the real-time processing CPU 12 of the completion of the restoration process of the application program 62. The power supply management program 86 of the application program 62 starts monitoring the state of the power supply by retrieving the parameter indicating the state of the power supply.

FIG. 11 illustrates a program once stored on the SDRAM 29 in the operating state S0 immediately prior to the pause. By executing the program stored on the SDRAM 29 in the suspension state S3, the hot boot startup is performed as shown in FIG. 11.

The operating system 61, the application program 62, the operating system 141 and the application program 142, each stored in the operating state S0 immediately prior to the pause, are continuously stored on the SDRAM 29 even in the suspension state S3 and after the start of the hot boot startup process.

At time t0, the reset state of the host CPU 11 is cleared. The host CPU 11 starts executing the boot loader stored at a predetermined address of the mask ROM 13. The host CPU 11 for executing the boot loader loads the second boot loader from the NAND-type flash memory 17 to the SDRAM 29. In response to a jump command of the boot loader, the host CPU 11 starts executing the second boot loader.

As previously discussed, the SDRAM 29 continuously stores the operating system 141 and application program 142 in the suspension state S3 and even after the start of the hot boot startup process. In the hot boot startup process, the host CPU 11 for performing the second boot loader is freed from loading the operating system 141 and application program 142 to the SDRAM 29.

The host CPU 11 for performing the second boot loader clears the reset state on the real-time processing CPU 12.

The real-time processing CPU 12 cleared from the reset state thereof starts executing a command in the program with a predetermined address of the SDRAM 29, thereby starting executing the operating system 141 at time t1.

Upon clearing the reset state on the real-time processing CPU 12, the host CPU 11 starts executing the power supply management mechanism 73 stored on the SDRAM 29. The host CPU 11 for executing the power supply management mechanism 73 performs a restoration process by detecting the state of the power supplies including the DC-DC converter 34 and the battery 35 and modifying an internal parameter in response to the detected state of the power supply.

In succession to the restoration process of the power supply management mechanism 73, the host CPU 11 starts executing the kernel 71 stored on the SDRAM 29 at time t2. The host CPU 11 for executing the kernel 71 performs a restoration process by detecting the availability state of memory space in the SDRAM 29 and modifying parameters of a process of managing resources such as the SDRAM 29.

In succession to the restoration process of the kernel 71, the host CPU 11 performs, at time t3, a restoration process of the device driver 72 stored on the SDRAM 29. More specifically, the host CPU 11 performs the restoration process of the device driver 72 by detecting device states of the signal processor 16, the serial interface 19, the graphic controller 21, the memory card interface 23, the controller 25, the IDE interface 28 and the general-purpose input-output unit 32 and modifying parameters of the device driver 72 in accordance with the detected device states.

In succession to the restoration process of the device driver 72, the host CPU 11 notifies the real-time processing CPU 12 of the completion of the restoration process of the device driver 72.

Upon receiving the notification of the completion of the restoration process of the device driver 72 from the host CPU 11, the real-time processing CPU 12 performs a real-time control process by performing the real-time processing program 171 and starts communicating with the host CPU 11.

In succession to the restoration process of the device driver 72, the host CPU 11 starts, at time t4, a restoration process of the application program 62 stored on the SDRAM 29. The host CPU 11 performs the restoration process of the application program 62 by setting values for the shutter speed, exposure, and zooming.

In succession to the restoration process of the application program 62, the host CPU 11 notifies the real-time processing CPU 12 of the completion of the restoration process of the application program 62. The power supply management program 86 of the application program 62 starts monitoring the state of the power supply by retrieving the parameter indicating the state of the power supply.

In the hot boot startup process, the host CPU 11 is freed from reading the warm boot image from the NAND-type flash memory 17 and then loading the read warm boot image onto the SDRAM 29. The hot boot startup process is more quickly started than the warm boot startup process.

The cold boot is now discussed. The cold boot may be performed in the plant of the digital still camera before the shipment thereof or may be performed after updating a so-called firmware. The cold boot is performed by opening the operating system 61 and application program 62 stored on the NAND-type flash memory 17.

FIG. 12 illustrates a startup procedure of the cold boot.

The host CPU 11, cleared from the reset state thereof, starts executing the boot loader stored on a predetermined address of the mask ROM 13 at time t0. The host CPU 11 for executing the boot loader loads the second boot loader from the NAND-type flash memory 17 onto the SDRAM 29. In response to a jump command of the boot loader, the host CPU 11 starts executing the second boot loader.

The host CPU 11 for executing the second boot loader starts loading the operating system 141 and application program 142 from the NAND-type flash memory 17 to the SDRAM 29 at time t1.

In succession to the loading of the operating system 141 and application program 142 to be executed by the real-time processing CPU 12 to the SDRAM 29, the host CPU 11 clears the real-time processing CPU 12 from the reset state thereof.

The reset-cleared real-time processing CPU 12 starts executing a command of the program with a predetermined address of the SDRAM 29 at time t2, thereby starting executing the operating system 141.

The host CPU 11 for executing the second boot loader loads the operating system 61 and application program 62 from the NAND-type flash memory 17 to the SDRAM 29.

In succession to the loading of the operating system 61 and application program 62 to the SDRAM 29, the host CPU 11 starts executing, at time t3, the power supply management mechanism 73 loaded to the SDRAM 29. The host CPU 11 for executing the power supply management mechanism 73 performs an initialization process by detecting the state of the power supplies containing the DC-DC converter 34 and the battery 35 and initializing an internal parameter in accordance with the detected power supply state.

Upon initializing the power supply management mechanism 73, the host CPU 11 starts executing, at time t4, the kernel 71 loaded to the SDRAM 29. The host CPU 11 for executing the kernel 71 performs an initialization process by detecting a size of memory space (range of addresses) of the SDRAM 29 and initializing parameters of a process managing resources such as the SDRAM 29.

Upon initializing the kernel 71, the host CPU 11 starts, at time t5, an initialization process of the device driver 72 loaded on the SDRAM 29. More specifically, the host CPU 11 performs the initialization process by detecting device states of the signal processor 16, the serial interface 19, the graphic controller 21, the memory card interface 23, the controller 25, the IDE interface 28 and the general-purpose input-output unit 32 and initializing parameters of the device driver 72 in accordance with the detected device states.

In succession to the completion of the initialization process of the device driver 72, the host CPU 11 notifies the real-time processing CPU 12 of the completion of the initialization process of the device driver 72.

Upon receiving the completion notification of the initialization process of the device driver 72 from the host CPU 11, the real-time processing CPU 12 executes the real-time processing program 171. The real-time processing CPU 12 thus performs the real-time process and starts communicating with the host CPU 11.

Subsequent to the completion of the initialization process of the device driver 72, the host CPU 11 starts, at time t6, initializing the application program 62 loaded to the SDRAM 29. In the initialization process of the application program 62, the host CPU 11 sets a variety of parameters for use in the photographing process and the monitoring process to default values.

Subsequent to the completion of the initialization process of the application program 62, the host CPU 11 notifies the real-time processing CPU 12 that the application program 62 has been initialized. The power supply management program 86 of the application program 62 starts monitoring the state of the power supply, for example by retrieving the parameter indicating the state of the power supply from the power supply management mechanism 73.

The host CPU 11 generates a warm boot image and stores the generated warm boot image onto the NAND-type flash memory 17.

Subsequent to the updating of the firmware, the cold boot startup process is performed to update the warm boot image on the NAND-type flash memory 17.

The host CPU 11 for executing the initialized operating system 61 may load the application program 62 from the NAND-type flash memory 17 to the SDRAM 29.

Figure 13:
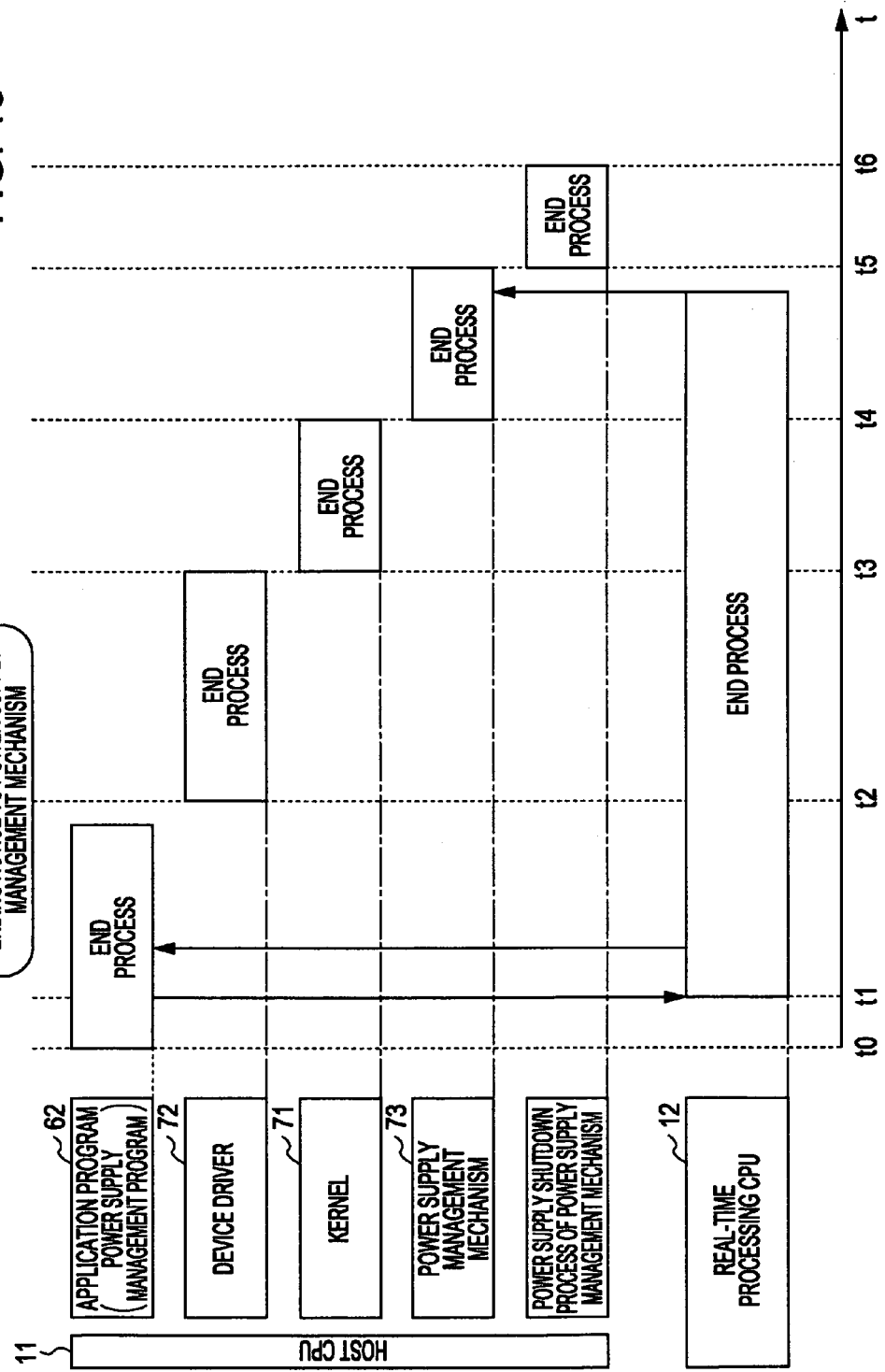
FIG. 13 illustrates a summary of a pause process.

The pause process for transitioning from the operating state S0 to the pause state is described below with reference to FIG. 13.

A start command to start the pause process is issued at time t0. The host CPU 11 for executing the application program 62 transitions the digital still camera to the initial state SON before transitioning to the pause state. The host CPU 11 for executing the application program 62 determines whether to transition to the suspension state S3 or the hibernation state S4.

The host CPU 11 for executing the application program 62 performs an end process for closing a file storing photographed image data, for example.

The host CPU 11 for executing the application program 62 notifies the real-time processing CPU 12 of the completion of the end process at time t1.

The real-time processing CPU 12 starts an end process for returning a lens forming the optical system (not shown) to an end position.

The power supply management program 86 of the application program 62 issues a command to transition to the determined one of the suspension state S3 and the hibernation state S4, thereby notifying the power supply management mechanism 73 of the completion of the end process.

Subsequent to the completion of the end process of the application program 62, the host CPU 11 starts an end process of the device driver 72 at time t2 by ending control of devices including the signal processor 16, the serial interface 19, the graphic controller 21, the memory card interface 23, the controller 25, the IDE interface 28 and the general-purpose input-output unit 32.

Subsequent to the completion of the end process of the device driver 72, the host CPU 11 performs, at time t3, an end process on the kernel 71, e.g., ending predetermined processes including the device monitoring of the application program 62, management of resources such as the SDRAM 29, interrupt process and inter-process communications.

When the end process of the kernel 71 is completed, the host CPU 11 starts an end process of the power supply management mechanism 73 by setting a parameter in the pause state at time t4.

In response to the reception of the completion notification of the end process from the real-time processing CPU 12, the host CPU 11 for executing the power supply management mechanism 73 requests, at time t5, the embedded controller 33 to stop supplying power (cut off power) via the serial interface 19. In response to the request to stop supplying power from the host CPU 11, at time t6, the embedded controller 33 causes the DC-DC converter 34 to stop supplying power to the host CPU 11 and the real-time processing CPU 12 while continuously allowing the DC-DC converter 34 to supply power to the SDRAM 29 in order to transition to the suspension state S3. In order to transition to the hibernation state S4, the embedded controller 33 causes the DC-DC converter 34 to stop supplying power to the SDRAM 29, the host CPU 11 and the real-time processing CPU 12.

The digital still camera pauses in one of the suspension state S3 and the hibernation state S4.

The warm boot, hot boot and cold boot startup processes are described in detail below.

Figure 14:
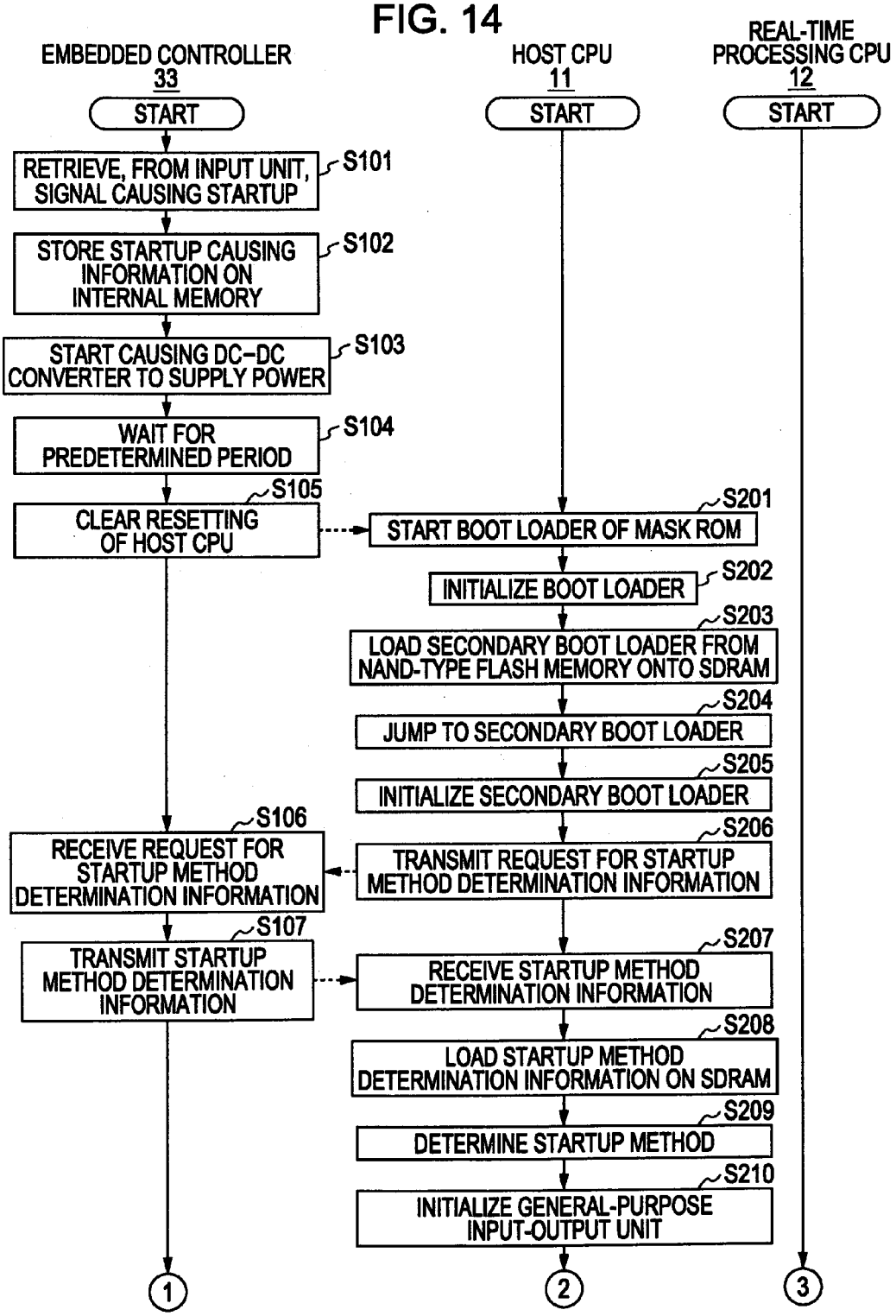
FIG. 14 is a flowchart illustrating in detail the start process of the warm boot.
Figure 15:
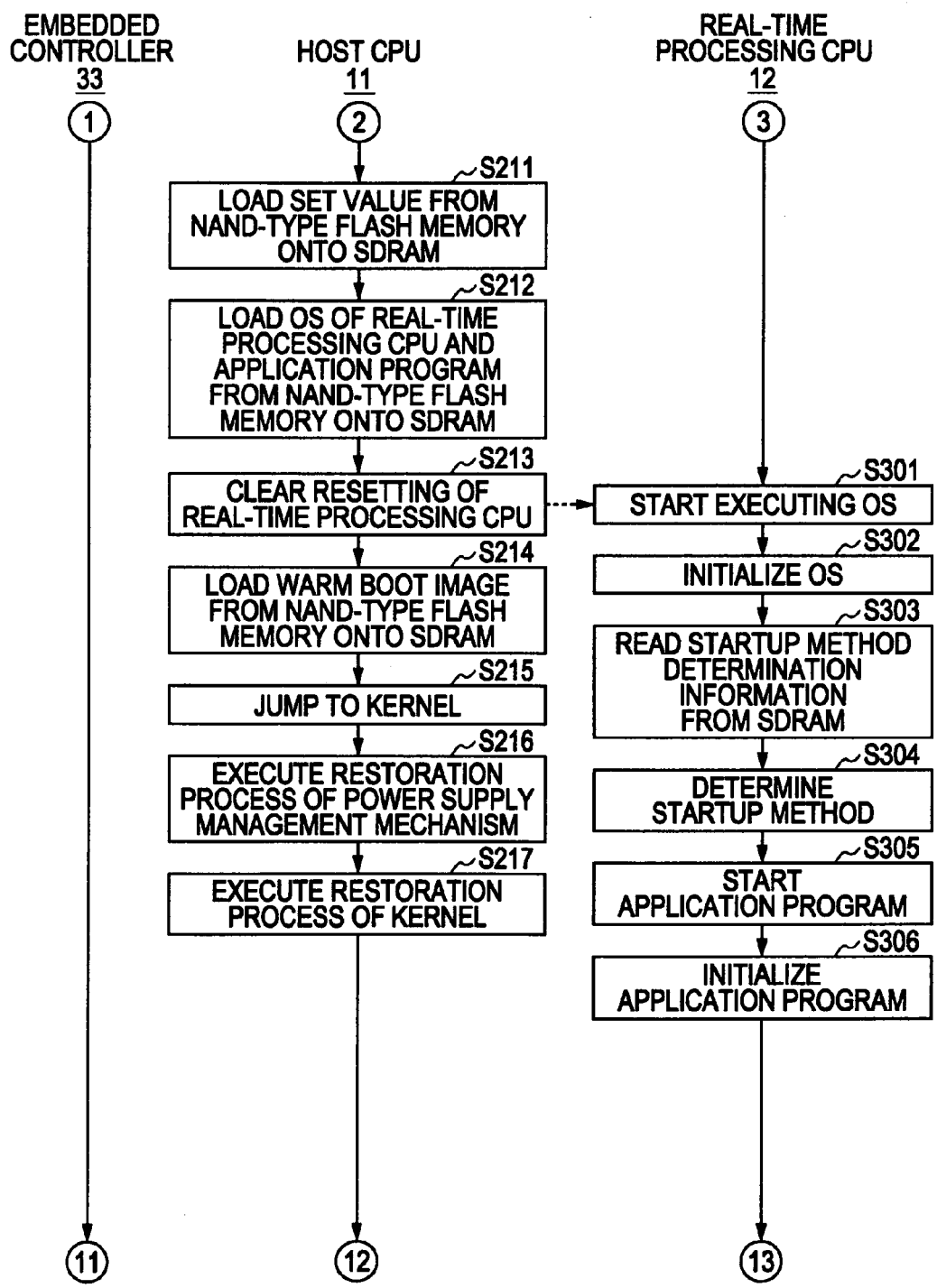
FIG. 15 is a continuation of the flowchart of FIG. 14.
Figure 16:
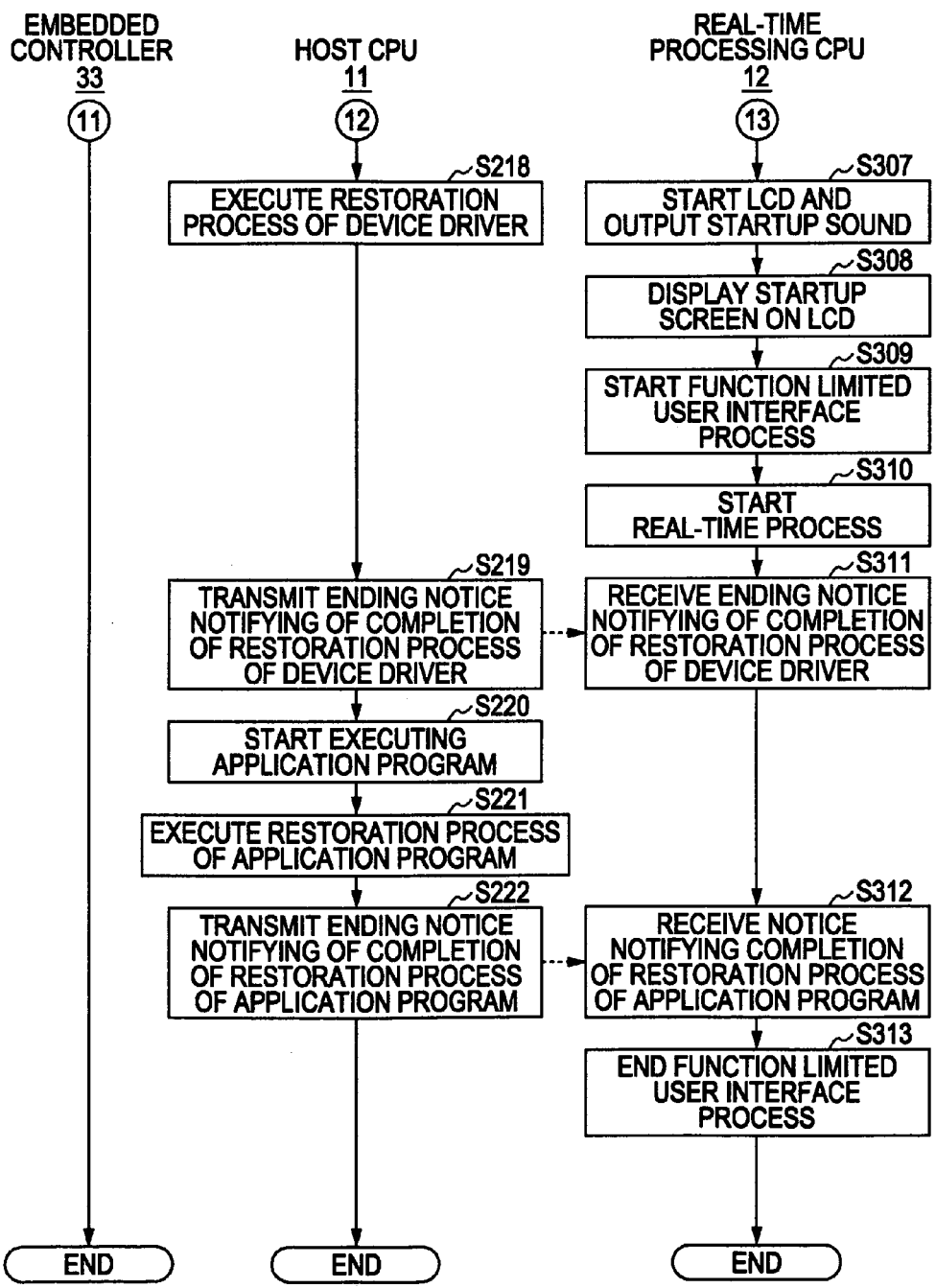
FIG. 16 is a continuation of the flowchart of FIG. 15.

FIGS. 14 through 16 are flowcharts illustrating in detail the warm boot startup process. In step S101, the embedded controller 33 for executing the startup method determination information retrieval program 203 acquires from the input unit 31 a signal serving as a trigger for the startup process. More specifically, the startup method determination information retrieval program 203 acquires from the input unit 31 the trigger signal in response to the pressing of one of the power button, the wireless LAN button and the USB button or the opening of the lens cap. In response to the acquired signal, the embedded controller 33 for executing the startup method determination information retrieval program 203 generates the startup trigger information indicating the startup trigger such as the pressing of one of the power button, the wireless LAN button and the USB button or the opening of the lens cap.

In step S102, the embedded controller 33 for executing the startup method determination information storage processing program 204 stores on the internal memory thereof the startup trigger information generated in step S101 in response to the acquired signal. More specifically, when the signal indicating the startup trigger is acquired from the input unit 31 in response to the pressing of one of the power button, the wireless LAN button and the USB button or the opening of the lens cap, the startup method determination information retrieval program 203 generates the startup trigger information indicating the startup trigger such as the pressing of one of the power button, the wireless LAN button and the USB button or the opening of the lens cap. The startup method determination information storage processing program 204 stores the generated startup trigger information on the internal memory of the embedded controller 33.

In step S103, the embedded controller 33 for executing the power supply control program 201 causes the DC-DC converter 34 to start supplying power to each block of the digital still camera. In this way, the host CPU 11 through the general-purpose input-output unit 32 are now powered.

In step S104, the embedded controller 33 waits on standby for a predetermined period of time until supplied power reaches a stabilized level and each block in the digital still camera powered is stabilized in operation.

In step S105, the embedded controller 33 for executing the other CPU reset control program 202 clears the reset state on the host CPU 11. For example, the embedded controller 33 clears the reset state on the host CPU 11 by changing the level of a reset signal on a signal line conducting the reset signal from the embedded controller 33 to the host CPU 11.

With the reset state cleared, the host CPU 11 starts the boot loader of the mask ROM 13 in step S201, thereby starting executing the boot loader. More specifically, the host CPU 11 starts the boot loader by executing a command stored at a predetermined address of the mask ROM 13 in response to a hardware interrupt for reset clearing. In step S202, the host CPU 11 initializes the boot loader.

In step S203, the host CPU 11 for executing the boot loader loads the secondary boot loader 101 from the NAND-type flash memory 17 to the SDRAM 29. In step S204, the host CPU 11 executes a jump command to the secondary boot loader 101 contained in the boot loader. Processing jumps to the secondary boot loader 101. As a result, the host CPU 11 starts executing the secondary boot loader 101.

Alternatively, the secondary boot loader 101 may be stored on the mask ROM 13, and processing may jump to the secondary boot loader 101 stored on the mask ROM 13.

In step S205, the host CPU 11 initializes the secondary boot loader 101. Since the secondary boot loader 101 contains a driver of the serial interface 19, the host CPU 11 can communicate with the embedded controller 33 via the serial interface 19.

In step S206, the host CPU 11 for executing the startup method determination information retrieval program 121 of the secondary boot loader 101 transmits a request for the startup method determination information to the embedded controller 33 via the serial interface 19.

In step S106, the embedded controller 33 for executing the startup method determination information providing program 205 receives the request for the startup method determination information from the host CPU 11 via the serial interface 19. In step S107, the embedded controller 33 for executing the startup method determination information providing program 205 transmits the startup method determination information stored on the internal memory of the embedded controller 33 to the host CPU 11 via the serial interface 19.

In step S207, the host CPU 11 for executing the startup method determination information retrieval program 121 of the secondary boot loader 101 receives the startup method determination information from the embedded controller 33 via the serial interface 19.

In step S208, the host CPU 11 for executing the startup method determination information retrieval program 121 of the secondary boot loader 101 stores the received startup method determination information on the SDRAM 29. In this case, the host CPU 11 stores the startup method determination information on a predetermined region of the storage area of the SDRAM 29.

In step S209, the host CPU 11 for executing the startup method determination program 122 of the secondary boot loader 101 determines the startup method based on the startup method determination information received in step S207. In this case, the host CPU 11 determines the warm boot startup as the startup method. The startup method determination program 122 determines the warm boot startup as the startup method if the pause state information indicates the suspension state S3 with the battery loading information indicating that the battery is unloaded or if the pause state information indicates the hibernation state S4.

In step S210, the host CPU 11 for executing the secondary boot loader 101 initializes the general-purpose input-output unit 32.

In step S211, the host CPU 11 for executing the set value reading program 123 of the secondary boot loader 101 loads set values required in the startup operation from the NAND-type flash memory 17 to the SDRAM 29 set. The set values are those for the shutter speed, exposure, the size of the image zoomed or photographed, and the compression rate in the encoding process.

In step S212, the host CPU 11 for executing the other CPU program reading program 124 of the secondary boot loader 101 loads the operating system 141 and application program 142 of the real-time processing CPU 12 from the NAND-type flash memory 17 to the SDRAM 29.

In step S213, the host CPU 11 for executing the secondary boot loader 101 clears the reset state on the real-time processing CPU 12.

With the reset state cleared, the real-time processing CPU 12 starts executing the operating system 141 loaded on the SDRAM 29 in step S301. More specifically, the real-time processing CPU 12 starts executing the operating system 141 by executing a command stored at a predetermined address of the SDRAM 29 in response to a hardware interrupt or a software interrupt for reset clearing. In step S302, the host CPU 11 initializes the operating system 141.

In step S303, the real-time processing CPU 12 for executing the startup method determination information retrieval program 161 of the operating system 141 reads the startup method determination information stored on the SDRAM 29 in step S208. In step S304, the real-time processing CPU 12 for executing the startup method determination program 162 of the operating system 141 determines the startup method based on the startup method determination information read in step S303 in the same manner as in step S209. In this case, the warm boot startup is determined as the startup method.

In step S305, the real-time processing CPU 12 for executing the operating system 141 starts the application program 142. In step S306, the real-time processing CPU 12 initializes the application program 142.

In step S307, the real-time processing CPU 12 for executing the application program 142 controls the graphic controller 21, thereby causing the LCD 20 to display data and one of a loudspeaker (not shown) and a buzzer (not shown) to emit a startup sound.

In step S308, the real-time processing CPU 12 for executing the startup screen displaying program 173 of the application program 142 controls the graphic controller 21, thereby causing the LCD 20 to display a startup screen.

In step S309, the real-time processing CPU 12 for executing the GUI processing program 172 of the application program 142 starts a user interface process for acquiring a user command from the input unit 31 shared with the host CPU 11. The user interface process has functions smaller in number than the application program 62, i.e., has limited number of functions.

In step S310, the real-time processing CPU 12 for executing the real-time processing program 171 of the application program 142 starts a real-time control process on the optical system (not shown), the CCD 14, the analog front end 15 and the signal processor 16.

If the startup trigger information of the startup method determination information indicates the opening of the lens cap in step S310, the real-time processing CPU 12 may initialize the optical system (not shown), the CCD 14, the analog front end 15 and the signal processor 16 in the real-time control process.

The host CPU 11 performs steps S214 through S218 while the real-time processing CPU 12 performs steps S301 through S310. More specifically, the host CPU 11 for executing the warm boot image reading program 125 of the secondary boot loader 101 loads the warm boot image from the NAND-type flash memory 17 to the SDRAM 29 in step S214.

In step S215, the host CPU 11 executes a jump command to the kernel 71 contained in the secondary boot loader 101. Processing jumps to the kernel 71. As a result, the host CPU 11 starts executing the operating system 61.

In step S216, the host CPU 11 for executing the operating system 61 performs a restoration process of the power supply management mechanism 73 by detecting the state of the power supplies such as the DC-DC converter 34 and the battery 35 and modifying the internal parameter in response to the detected state of the power supplies.

In step S217, the host CPU 11 for executing the operating system 61 performs a restoration process of the kernel 71 by detecting the availability state of memory space in the SDRAM 29 and modifying parameters of a process of managing resources such as the SDRAM 29.

In step S218, the host CPU 11 for executing the operating system 61 performs a restoration process of the device driver 72 by detecting device states of the signal processor 16, the serial interface 19, the graphic controller 21, the memory card interface 23, the controller 25, the IDE interface 28 and the general-purpose input-output unit 32 and modifying parameters of the device driver 72 in accordance with the detected device states.

In step S219, the host CPU 11 for executing the operating system 61 notifies the real-time processing CPU 12 of the completion of the restoration process of the device driver 72 via the bus.

In step S311, the real-time processing CPU 12 for executing the operating system 141 receives the completion notification of the restoration process of the device driver 72 from the host CPU 11 via the bus.

In step S220, the host CPU 11 for executing the operating system 61 starts executing the application program 62. In step S221, the host CPU 11 performs a restoration process of the application program 62, such as setting values for shutter speed, exposure, and zooming.

The digital still camera proceeds to the initial state SON subsequent to step S221.

In step S222, the host CPU 11 notifies the real-time processing CPU 12 of the completion of the restoration process of the application program 62 via the bus.

In step S312, the real-time processing CPU 12 receives the completion notification of the restoration process of the application program 62 from the host CPU 11 via the bus.

In step S313, the real-time processing CPU 12 for executing the application startup completion control program 163 of the operating system 141 ends the GUI processing program 172 of the application program 142, thereby completing a user interface process having limited number of functions. The warm boot startup process thus ends.

Through the warm boot startup process, the digital still camera can quickly transition from the pause state to the initial state SON.

Figure 17:
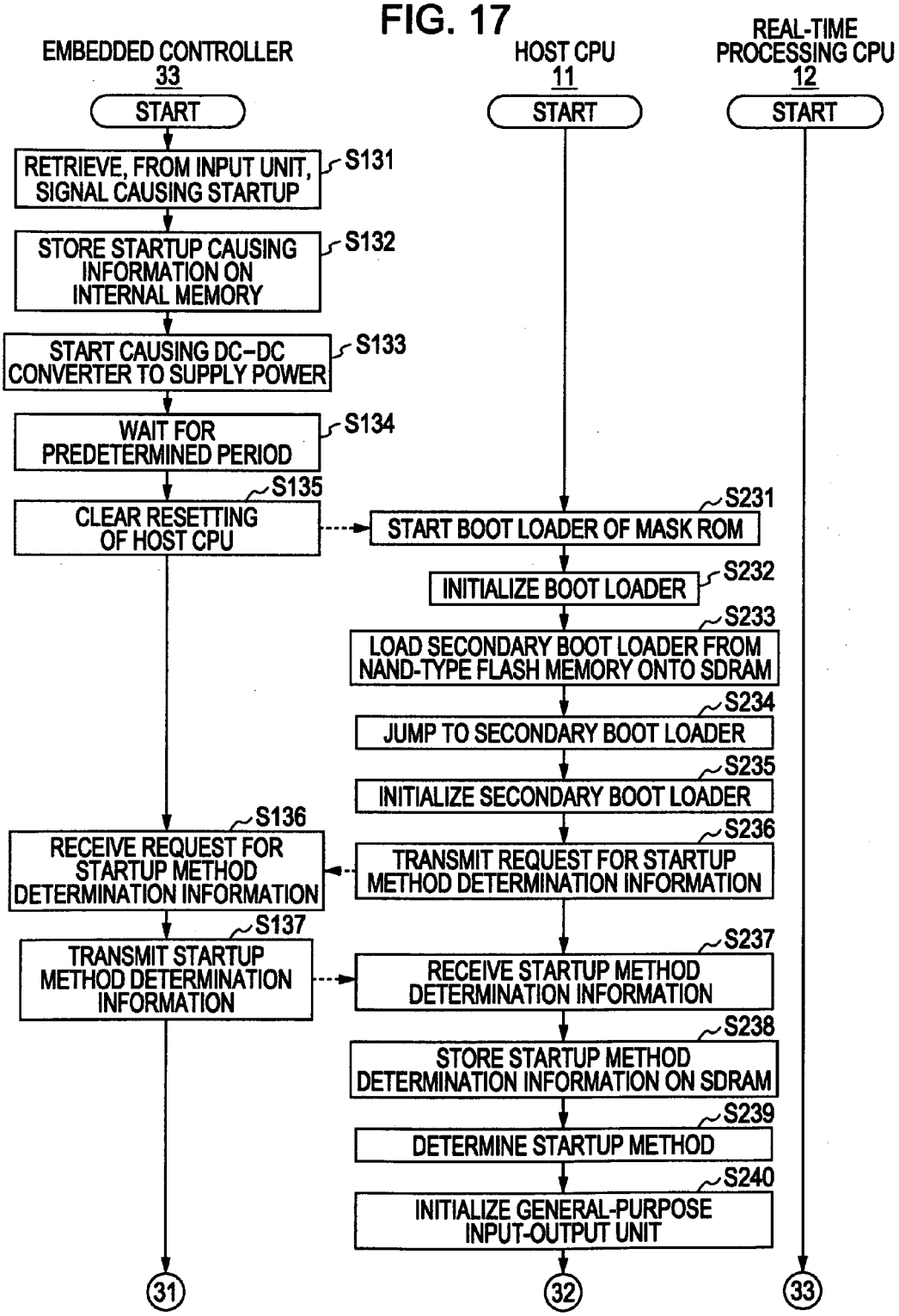
FIG. 17 is a flowchart illustrating in detail the startup process of the hot boot.
Figure 18:
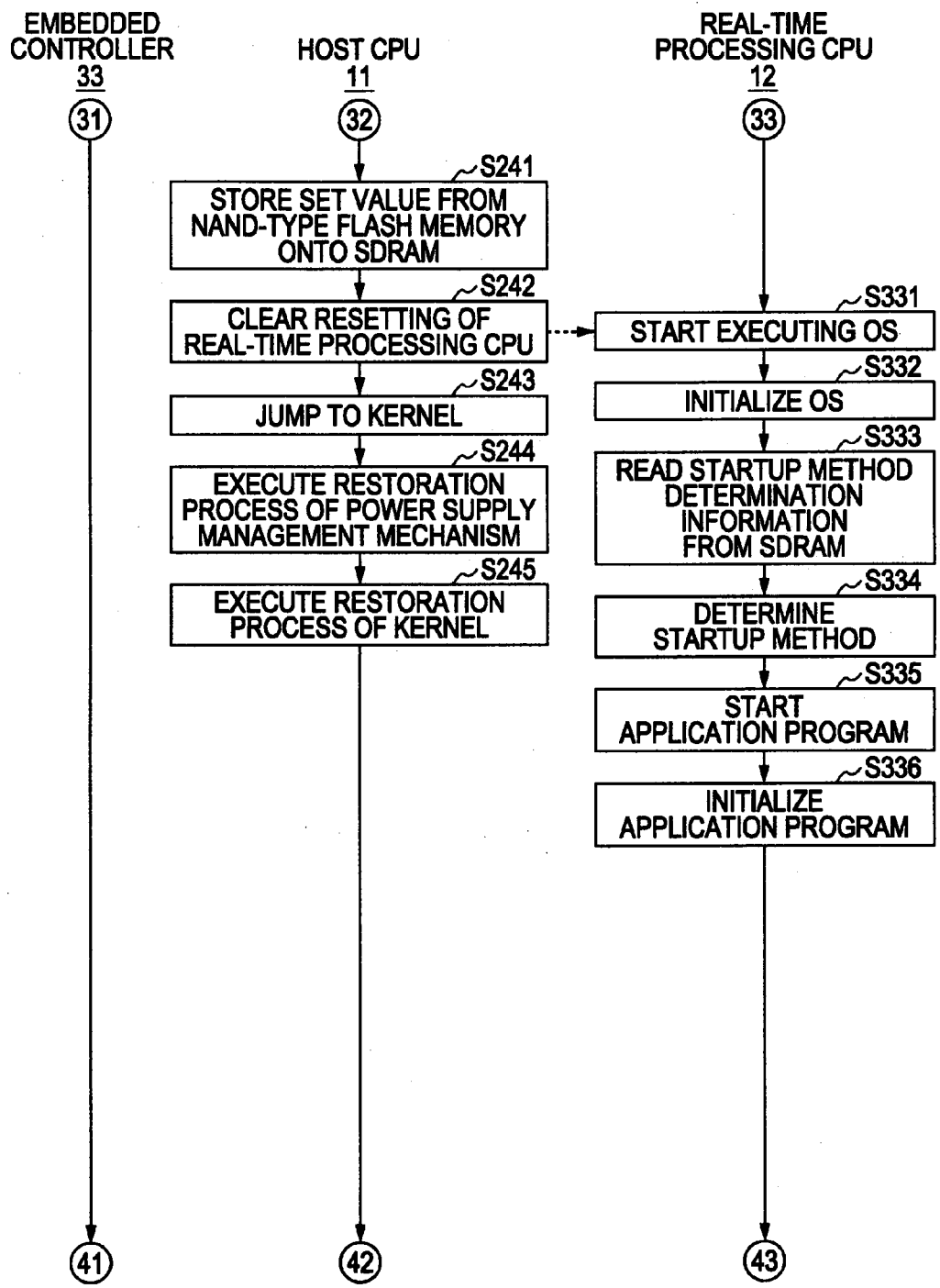
FIG. 18 is a continuation of the flowchart of FIG. 17.
Figure 19:
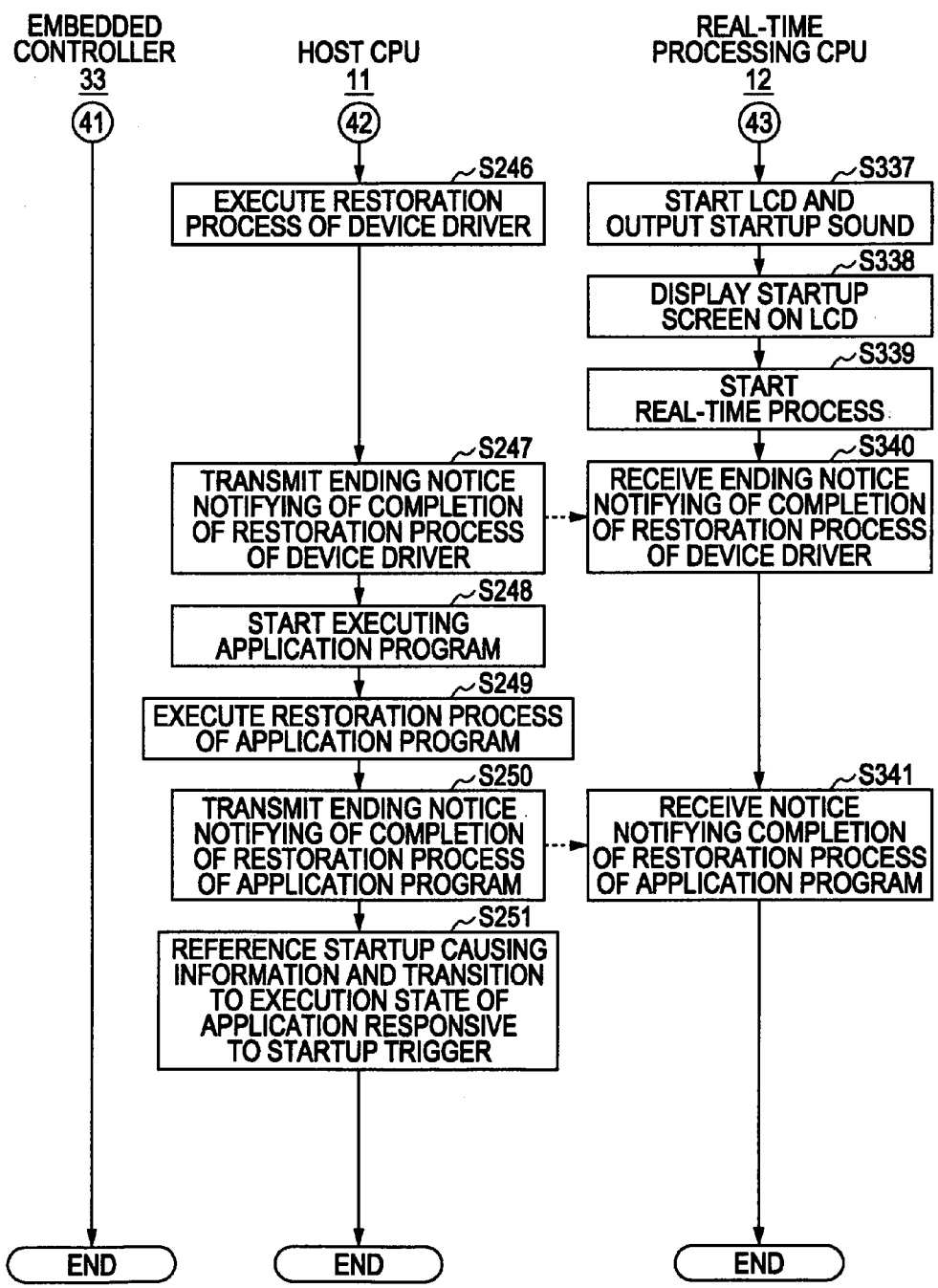
FIG. 19 is a continuation of the flowchart of FIG. 18.

The hot boot startup process is described in detail below with reference to flowcharts of FIGS. 17 through 19.

Steps S131 through S137 of the embedded controller 33 are respectively identical to steps S101 through S107 of FIG. 14, and the discussion thereof is omitted here.

Steps S231 through S238 of the host CPU 11 are respectively identical to steps S201 through S208 of FIG. 14, and the discussion thereof is omitted herein.

In step S239, the host CPU 11 for executing the startup method determination program 122 of the secondary boot loader 101 determines the startup method based on the startup method determination information received in step S237. In this case, the host CPU 11 determines the hot boot startup method as the startup method. If the pause state information indicates the suspension state S3 with the battery loading information indicating that the battery is not unloaded, the startup method determination program 122 determines the hot boot startup method as the startup method.

Steps S240 and S241 of the host CPU 11 are respectively identical to step S210 and S211 of FIGS. 14 and 15, and the discussion thereof is omitted here.

In step S242, the host CPU 11 for executing the secondary boot loader 101 clears the reset state on the real-time processing CPU 12.

Steps S331 through S333 of the real-time processing CPU 12 are respectively identical to steps S301 through S303 of FIG. 15, and the discussion thereof is omitted here.

In step S334, the real-time processing CPU 12 for executing the startup method determination program 162 of the operating system 141 determines the startup method based on the startup method determination information read in step S333 in the same manner as in step S239. The real-time processing CPU 12 determines the hot boot startup method as the startup method.

Steps S335 through S338 of the real-time processing CPU 12 are respectively identical steps S305 through S308 of FIGS. 15 and 16, and the discussion thereof is omitted here.

In step S339, the real-time processing CPU 12 for executing the real-time processing program 171 of the application program 142 starts a real-time control process on the optical system (not shown), the CCD 14, the analog front end 15 and the signal processor 16.

In this case, the real-time processing CPU 12 executes the GUI processing program 172 in a controlled manner. The real-time processing CPU 12 thus performs a user interface process for acquiring a user command from the input unit 31 shared with the host CPU 11. In this case, the real-time processing CPU 12 performs the user interface process with the function thereof limited, namely, with the functions thereof smaller in number than the application program 62.

In the hot boot startup process, the host CPU 11 starts up at an extremely fast speed, and an even quicker startup is achieved with the real-time processing CPU 12 not performing the GUI processing program 172.

Steps S331 through S339 are performed by the real-time processing CPU 12 while steps S243 through S246 are performed by the host CPU 11 in parallel. More specifically, in step S243, the host CPU 11 executes a jump command to the kernel 71 contained in the secondary boot loader 101, thereby jumping to the kernel 71. The host CPU 11 starts executing the operating system 61.

Steps S244 through S246 of the host CPU 11 are respectively identical to steps S216 through S218 of FIGS. 15 and 16, and the discussion thereof is omitted here.

Steps S247 through S250 of FIG. 11 are respectively identical to steps S219 through S222 of FIG. 16, and the discussion thereof is omitted here. Also, steps S340 and step S341 of the real-time processing CPU 12 are respectively identical to steps S311 and S312 of FIG. 16 and the discussion thereof is omitted here.

In step S251 subsequent to step S250, the host CPU 11 for executing the state transition processing program 85 of the application program 62 references the startup trigger information of the startup method determination information stored on the SDRAM 29. The host CPU 11 then transitions the digital still camera to an execution state of the application responsive to the trigger type. The hot boot startup process thus ends. If the startup is triggered by the pressing of the power button on the input unit 31, the state transition processing program 85 transitions the digital still camera to the monitoring process execution state in step S251 by starting the monitor processing program 82. If the startup is triggered by the opening of the lens cap, the state transition processing program 85 transitions the digital still camera to the photographing process execution state in step S251 by starting the photographing processing program 81.

Through the hot boot startup process, the digital still camera is quickly started up and transitioned to the execution state responsive to the trigger type in the operating state S0.

Figure 20:
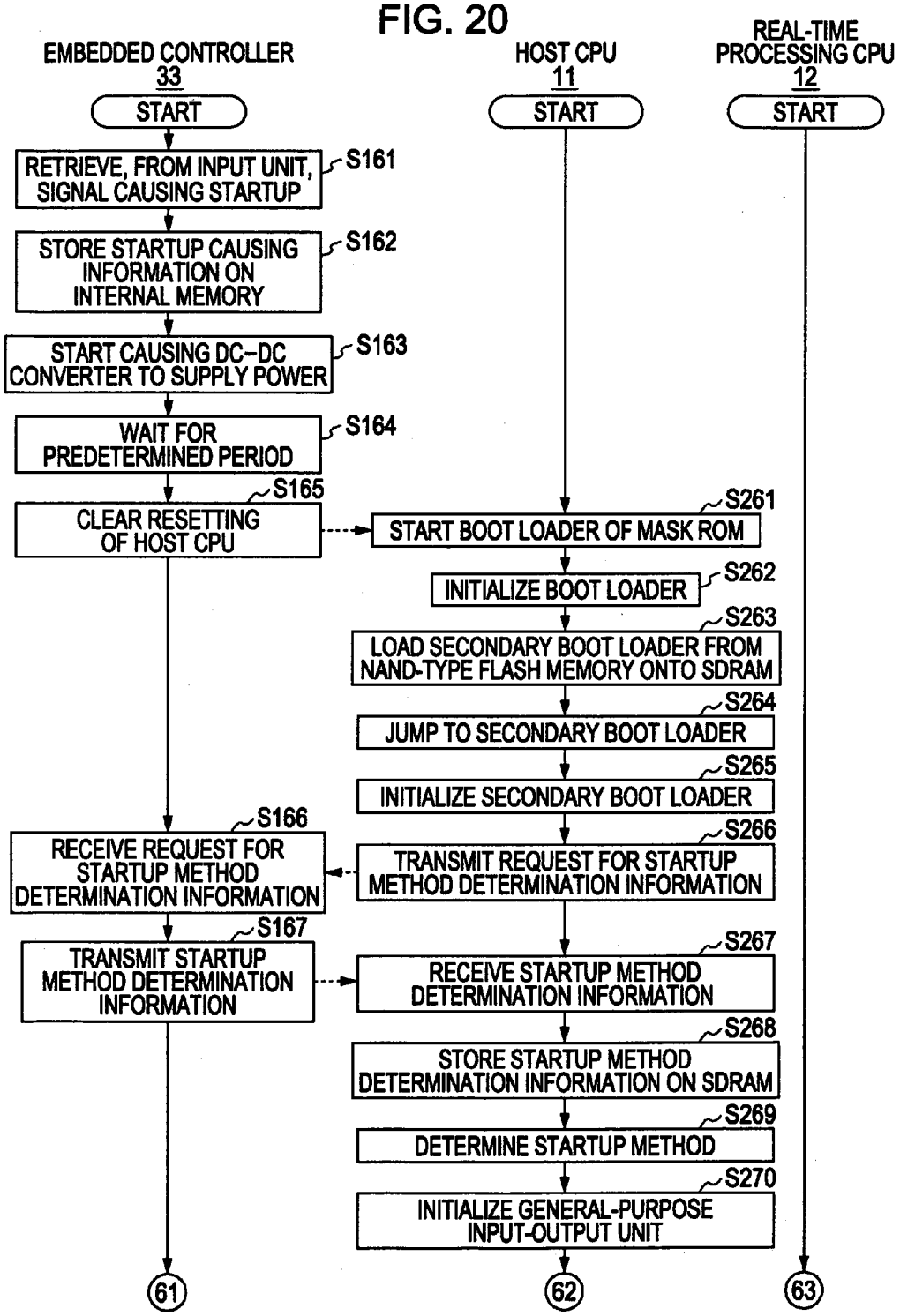
FIG. 20 is a flowchart illustrating in detail the startup process of the cold boot.
Figure 21:
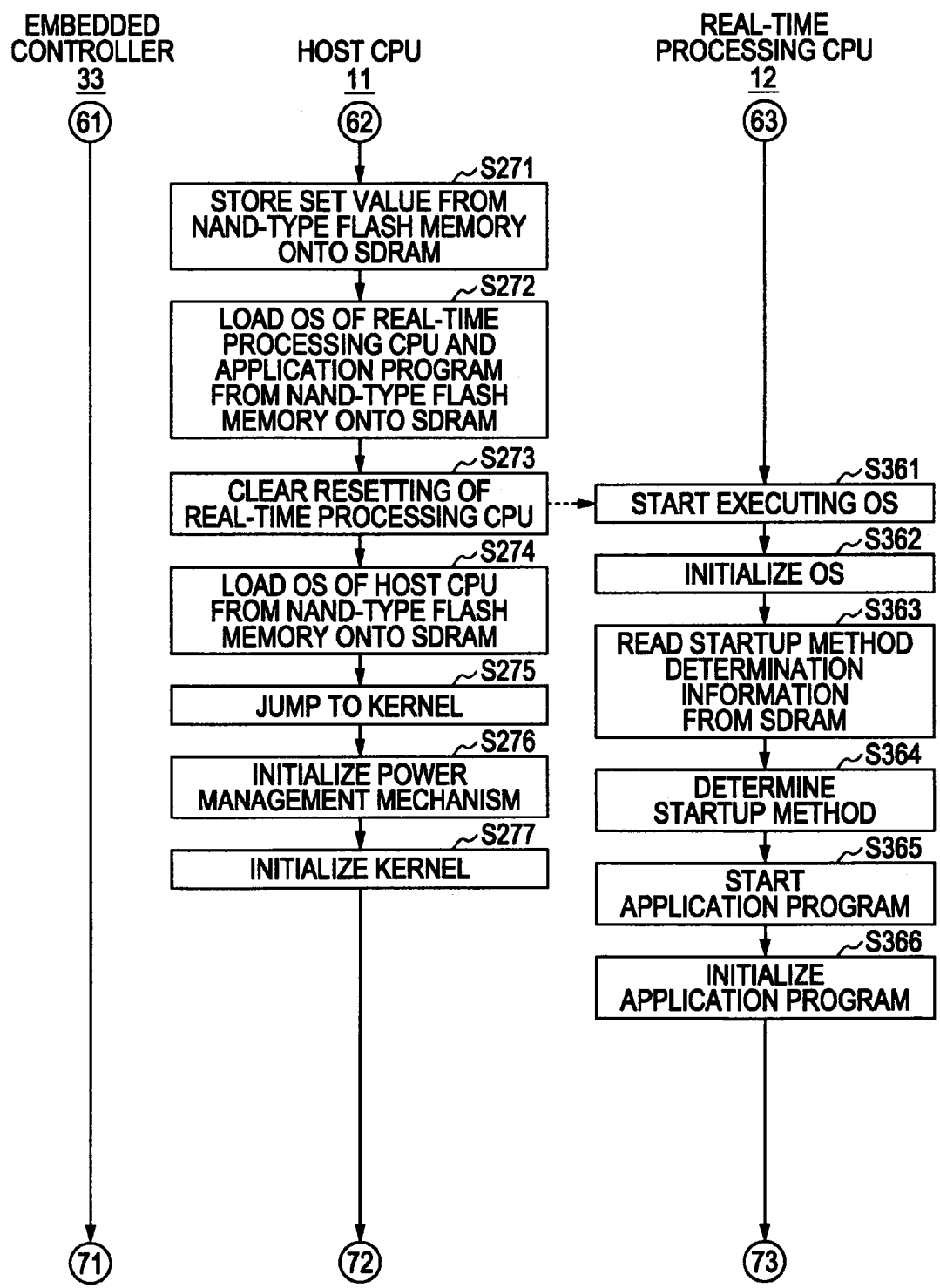
FIG. 21 is a continuation of the flowchart of FIG. 20.

The cold boot startup process is described in detail with reference to FIGS. 20 through 22. The cold boot startup process is typically performed when the digital still camera is shipped from the plant thereof or when a so-called firmware thereof is updated.

Steps S161 through S167 of the embedded controller 33 are respectively identical to steps S101 through S107 of FIG. 14 and the discussion thereof is omitted here.

Steps S261 through S268 of the host CPU 11 are respectively identical to steps S201 through S208 of FIG. 14 and the discussion thereof is omitted here.

In step S269, the host CPU 11 for executing the startup method determination program 122 of the secondary boot loader 101 determines the startup method based on the startup method determination information received in step S267. In this case, the cold boot startup method is determined as the startup method.

In step S269, the host CPU 11 for executing the startup method determination program 122 references an image generation flag contained in the pause state information. If the image generation flag is set, a warm boot image is generated. The host CPU 11 determines the cold boot startup method as the startup method.

If an updated firmware is acquired and the user requests the firmware to be updated, the image generation flag is to be set in a pause process to be discussed later.

Steps S270 through S273 of the host CPU 11 are respectively identical to steps S210 through S213 of FIGS. 14 and 15, and the discussion thereof is omitted here.

Steps S361 through S263 of the real-time processing CPU 12 are respectively identical to steps S301 through S303 of FIG. 15, and the discussion thereof is omitted here.

In step S364, the real-time processing CPU 12 for executing the startup method determination program 162 of the operating system 141 determines the startup method based on the startup method determination information read in step S363 in the same manner as in step S269. The real-time processing CPU 12 determines the cold boot startup method as the startup method.

Steps S365 and S366 of the real-time processing CPU 12 are respectively identical to steps S305 and S306 of FIG. 15, and the discussion thereof is omitted here.

In step S367, the real-time processing CPU 12 for executing the application program 142 controls the real-time processing CPU 12, thereby causing the LCD 20 to display an indication that the updating of the firmware is in progress.

The user can thus know that the firmware is currently being updated.

If a display control to display the indication that the updating of the firmware is in progress is left to the responsibility of the host CPU 11, the warm boot image displaying the indication that the updating of the firmware is in progress is generated. Since the real-time processing CPU 12 performs the display control process to display the indication, the indication that the updating of the firmware is in progress is not displayed even if the warm boot startup process is executed using the generated warm boot image.

In step S368, the real-time processing CPU 12 for executing the real-time processing program 171 of the application program 142 starts performing a real-time control process on the optical system (not shown), the CCD 14, the analog front end 15 and the signal processor 16.

In this case, the real-time processing CPU 12 executes the GUI processing program 172 in a controlled manner. The real-time processing CPU 12 thus performs a user interface process for acquiring a user command from the input unit 31 shared with the host CPU 11. In this case, the real-time processing CPU 12 performs the user interface process with the function thereof limited, namely, with the functions thereof smaller in number than the application program 62. The real-time processing CPU 12 thus executes the startup screen displaying program 173, thereby displaying the startup screen on the LCD 20 in a restrained manner.

Steps S361 through S368 are performed by the real-time processing CPU 12 while steps S274 through S278 are performed by the host CPU 11 in parallel. More specifically, in step S274, the host CPU 11 for executing the secondary boot loader 101 loads the operating system 61 from the NAND-type flash memory 17 to the SDRAM 29.

In step S275, the host CPU 11 executes a jump command to the kernel 71 contained in the secondary boot loader 101, thereby jumping to the kernel 71. The host CPU 11 starts executing the operating system 61.

In step S276, the host CPU 11 for executing the power supply management mechanism 73 of the operating system 61 performs an initialization process of the power supply management mechanism 73 by detecting the state of the power supplies including the DC-DC converter 34 and the battery 35 and initializing the internal parameter in accordance with the detected state of the power supplies.

In step S277, the host CPU 11 for executing the kernel 71 of the operating system 61 performs an initialization process on the kernel 71 by detecting the availability state of memory space in the SDRAM 29 and modifying parameters of a process of managing resources such as the SDRAM 29.

In step S278, the host CPU 11 executing the operating system 61 performs an initialization process on the device driver 72 by detecting devices and states of the devices including the signal processor 16, the serial interface 19, the graphic controller 21, the memory card interface 23, the controller 25, the IDE interface 28 and the general-purpose input-output unit 32 and initializing parameters of the device driver 72 in accordance with the detection results.

In step S279, the host CPU 11 for executing the operating system 61 notifies the real-time processing CPU 12 of the completion of the initialization process of the device driver 72 via the bus.

In step S369, the real-time processing CPU 12 for executing the operating system 141 receives the completion notification of the initialization process of the device driver 72 from the host CPU 11 via the bus.

In step S280, the host CPU 11 for executing the operating system 61 loads the application program 62 from the NAND-type flash memory 17 to the SDRAM 29. In step S281, the host CPU 11 for executing the operating system 61 starts executing the application program 62.

In step S282, the host CPU 11 initializes the application program 62. The digital still camera is transitioned to the initial state SON subsequent to step S282.

In step S283, the host CPU 11 notifies the real-time processing CPU 12 of the completion of the initialization process of the application program 62 via the bus.

In step S370, the real-time processing CPU 12 receives the completion notification of the initialization process of the application program 62 from the host CPU 11 via the bus.

In step S284, the host CPU 11 for executing the pause state information providing program 75 transmits a request to clear the image generation flag to the embedded controller 33 via the serial interface 19.

In step S168, the embedded controller 33 for executing the startup method determination information retrieval program 203 receives the request to clear the image generation flag from the host CPU 11 via the serial interface 19.

In step S169, the embedded controller 33 for executing the startup method determination information storage processing program 204 clears the image generation flag contained in the pause state information.

In step S285, the host CPU 11 for executing the warm boot image generating program 78 of the operating system 61 reads the program and data stored on the SDRAM 29 and generates the warm boot image. More specifically, the warm boot image generating program 78 generates the warm boot image using the program and data loaded on the SDRAM 29 in the initial state SON of the operating state S0.

In step S286, the host CPU 11 for executing the warm boot image generating program 78 of the operating system 61 causes the NAND-type flash memory 17 to store the warm boot image generated in step S285, thereby completing the cold boot startup process. In step S286, for example, the warm boot image generating program 78 stores the generated warm boot image on the NAND-type flash memory 17 in a manner such that the generated warm boot image overwrites the warm boot image stored heretofore on the NAND-type flash memory 17.

Through the cold boot startup process, the warm boot image containing the updated firmware is generated and stored on the NAND-type flash memory 17.

An end process to be discussed below may be performed immediately subsequent to step S286.

In one option, after verifying that the warm boot image has been normally generated, the host CPU 11 may transmit a request to clear the image generation flag to the embedded controller 33 via the serial interface 19. The embedded controller 33 may receive the request to clear the image generation flag and clear the image generation flag contained in the pause state information. In this option, the image generation flag is cleared only when the warm boot image has been normally generated. The warm boot image is thus generated more reliably.

In another option, the image generation flag may be cleared after the warm boot image is normally stored on the NAND-type flash memory 17.

In yet another option, the digital still camera is set to pause after the completion of the cold boot startup process, and is then started in the warm boot method using the warm boot image generated in step S285. The image generation flag is cleared only when the digital still camera is normally started. In this way, the image generation flag is cleared only when the digital still camera is normally started using the warm boot image.

In still another option, an image generated flag indicating whether the warm boot image is generated is contained together with the image generation flag in the pause state information. If the warm boot image is generated, the image generated flag is set. At the next startup, the set image generated flag and the image generation flag are referenced, the warm boot startup method is determined as the startup method, and the restoration process of the operating system 61 is completed. The image generated flag and the image generation flag are then cleared.

With the image generated flag reset and the image generation flag set, the cold boot startup method is determined as the startup method. With the image generated flag reset and the image generation flag reset, the startup method is determined based on the pause state to transition to and the history of battery loading of the battery 35 in the pause state.

The pause process is described below with reference to a flowchart of FIG. 23.

In step S501, the host CPU 11 for executing the state transition processing program 85 of the application program 62 transitions the digital still camera to the initial state SON of the operating state S0 by ending one of the execution of the photographing processing program 81, the monitor processing program 82, the setting processing program 83 and the USB mass storage class processing program 84.

In step S502, the host CPU 11 for executing the pause state determination program 74 of the operating system 61 determines the pause state to transition to. More specifically, the pause state determination program 74 determines whether to transition to the suspension state S3 or the hibernation state S4.

In step S502, the pause state determination program 74 determines the suspension state S3 as the pause state to transition to if the power button is pressed on the input unit 31 with the output voltage of the battery 35 equal to or higher than the threshold value or if the lens cap is closed with the output voltage of the battery 35 equal to or higher than the threshold value.

In step S502, the pause state determination program 74 determines the hibernation state S4 as the pause state to transition to if the output voltage of the battery 35 is lower than the threshold value or if the power button is continuously pressed for a period of time longer than a predetermined time.

In step S503, the host CPU 11 for executing the pause state information providing program 75 of the operating system 61 transmits, to the embedded controller 33 via the serial interface 19, the pause state information indicating the pause state to transition to.

In step S601, the embedded controller 33 for executing the startup method determination information retrieval program 203 receives the pause state information from the host CPU 11 via the serial interface 19. In step S602, the embedded controller 33 for executing the startup method determination information storage processing program 204 stores the pause state information received in step S601 onto the internal memory of the embedded controller 33.

The updated firmware, namely, one of the operating system 61 and the application program 62 may be acquired and the user may request the firmware to be updated. In step S503, the pause state information containing the set image generation flag is transmitted. In step S601, the pause state information containing the set image generation flag is received. In step S602, the pause state information containing the set image generation flag is stored onto the internal memory of the embedded controller 33.

The updated firmware may not be acquired, or the user may not request the firmware to be updated even if the updated firmware is acquired. In such a case, the pause state information containing the cleared image generation flag is transmitted in step S503. In step S601, the pause state information containing the cleared image generation flag is received. In step S602, the pause state information containing the cleared image generation flag is stored on the internal memory of the embedded controller 33.

In step S603, the embedded controller 33 for executing the battery loading detection program 206 detects the output voltage of the DC-DC converter 34, thereby determining whether the battery 35 is loaded. The embedded controller 33 for executing the startup method determination information retrieval program 203 generates the battery loading information in response to the detection results of the loading of the battery 35.

In step S604, the embedded controller 33 for executing the startup method determination information storage processing program 204 stores on the internal memory thereof the battery loading information responsive to the detection results of the loading of the battery 35. If it is determined in step S604 that the battery 35 is unloaded, the startup method determination information storage processing program 204 stores on the internal memory of the embedded controller 33 the battery loading information indicating that the battery 35 is unloaded. If it is determined in step S604 that the battery 35 is not unloaded, the startup method determination information storage processing program 204 stores on the internal memory of the embedded controller 33 the battery loading information indicating that the battery 35 is not unloaded.

In step S504, the host CPU 11 for executing the application program 62 performs an end process of the application program 62. In step S504, for example, the application program 62 performs the end process by closing the file storing photographed image data.

In step S505, the host CPU 11 for executing the application program 62 notifies the real-time processing CPU 12 of the completion of the end process.

In step S701, the real-time processing CPU 12 for executing the operating system 141 receives the completion notification of the end process from the host CPU 11 via the bus.

In step S702, the real-time processing CPU 12 for executing the operating system 141 and application program 142 performs the end process. In step S703, the real-time processing CPU 12 for executing the operating system 141 notifies the host CPU 11 of the completion of the end process via the bus.

In step S702, for example, the real-time processing program 171 of the application program 142 returns a lens forming the optical system (not shown) to an end position thereof.

In step S506, the host CPU 11 for executing the application program 62 receives the completion notification of the end process from the real-time processing CPU 12 via the bus.

Upon completion of the end process, the real-time processing CPU 12 for executing the operating system 141 notifies the host CPU 11 of the completion of the end process via the bus in step S704. In step S507, the host CPU 11 for executing the operating system 61 receives the completion notification of the end process from the real-time processing CPU 12 via the bus.

After transmitting to the host CPU 11 the completion notification of the end process, the real-time processing CPU 12 is reset by the host CPU 11 having received the completion notification of the end process. The real-time processing CPU 12 then remains rest or executes an infinite loop command.

In step S508, the host CPU 11 for executing the set value storage processing program 77 of the operating system 61 causes the NAND-type flash memory 17 to store set values to be used to return to the startup process. The set values to be stored on the NAND-type flash memory 17 contains the shutter speed, exposure, the size of the image zoomed or photographed, the compression rate in the encoding process, memory card management information of the memory card 22, and set values such as register values in the host CPU 11. The set values stored on the NAND-type flash memory 17 in step S508 includes values at registers in the real-time processing CPU 12 and values at registers in interfaces in the real-time processing CPU 12, the values being managed on the SDRAM 29 as variables of the operating system 141 and application program 142.

In step S509, the host CPU 11 for executing the operating system 61 performs an end process of the device driver 72. More specifically, the operating system 61 performs the end process of the device driver 72 by ending a process for controlling devices including the serial interface 19, the graphic controller 21, the memory card interface 23, the controller 25, the IDE interface 28 and the general-purpose input-output unit 32.

In part of the end process of the device driver 72 performed in step S510, the host CPU 11 for executing the other CPU program reading program 76 of the operating system 61 loads the operating system 141 and application program 142 of the real-time processing CPU 12 from the NAND-type flash memory 17 to the SDRAM 29.

That arrangement frees the host CPU 11 from loading the operating system 141 and application program 142 from the NAND-type flash memory 17 to the SDRAM 29 when the next warm boot startup process is to be performed. An even quicker startup is performed.

While the real-time processing CPU 12 is performing the end process, the operating system 141 and application program 142 are executed with internal variables thereof modified. The loading of the operating system 141 and application program 142 from the NAND-type flash memory 17 to the SDRAM 29 is preformed subsequent to the end process of the real-time processing CPU 12.

The real-time processing CPU 12 may be reset by the host CPU 11 before the host CPU 11 loads the operating system 141 and application program 142 from the NAND-type flash memory 17 to the NAND-type flash memory 17, and the real-time processing CPU 12 may be left in the reset state. Such an operation can load the operating system 141 and application program 142 from the NAND-type flash memory 17 to the NAND-type flash memory 17 and perform the startup process more safely than when the real-time processing CPU 12 executes an infinite loop command. More specifically, such an operation reduces the possibility that the operating system 141 and application program 142 loaded on the SDRAM 29 is modified by the real-time processing CPU 12 prior to a next startup.

If the real-time processing CPU 12 executes an infinite loop command rather than being transitioned to the reset state, the infinite loop command is stored on a storage region other than the storage area storing the operating system 141 and application program 142. For example, the real-time processing CPU 12 executes either the infinite loop command stored on the storage region other than the storage area storing the operating system 141 and application program 142 or the infinite loop command stored on the mask ROM 13.

After completing the end process, the real-time processing CPU 12 remains in the reset state or executes the infinite loop command. This prevents the operating system 141 and application program 142 loaded on the SDRAM 29 from being modified until the digital still camera is started up next in the hot boot method.

If the pause state is determined to be the hibernation state S4 in step S502, step S510 may be skipped.

Subsequent to the completion of the end process of the device driver 72, the host CPU 11 for executing the operating system 61 performs an end process of the kernel 71 in step S511. In step S511, for example, the operating system 61 completes a predetermined process, such as monitoring the application program 62, managing resources such as the SDRAM 29, and performing inter-process communications.

Upon completing the end process of the kernel 71, the host CPU 11 for executing the operating system 61 performs an end process of the power supply management mechanism 73, such as setting a parameter in the pause state in step S512.

In step S513, the host CPU 11 for executing the power supply management mechanism 73 of the operating system 61 transmits a request to stop supplying power to the embedded controller 33 via the serial interface 19.

In step S605, the embedded controller 33 for executing the power supply control program 201 receives the request to stop supplying power from the host CPU 11 via the serial interface 19.

In step S606, the embedded controller 33 for executing the power supply control program 201 causes the DC-DC converter 34 to stop supplying power. Processing thus ends.

In step S606, the power supply control program 201 references the pause state information stored on the internal memory of the embedded controller 33. To transition to the suspension state S3, the power supply control program 201 causes the DC-DC converter 34 to stop supplying power (cut off power) to the host CPU 11 and the real-time processing CPU 12 while continuously supplying power to the SDRAM 29. To transition to the hibernation state S4, the power supply control program 201 causes the DC-DC converter 34 to stop supplying power to the SDRAM 29, the host CPU 11 and the SDRAM 29.

The pause state is determined, and the pause state information indicating the pause state is stored on the internal memory of the embedded controller 33. The digital still camera is then transitioned to the determined pause state. Prior to the transition to the pause state, the set values required to return to the startup are stored on the NAND-type flash memory 17.

Prior to the transition to the suspension state S3, the operating system 141 and application program 142 of the real-time processing CPU 12 are loaded onto the SDRAM 29.

If the operating system 141 and application program 142 of the real-time processing CPU 12 are to be loaded to the SDRAM 29 prior to the transition to the suspension state S3, the real-time processing CPU 12 reads in the above-described step S332 the values at the registers in the real-time processing CPU 12 and the values in the interfaces in the real-time processing CPU 12, the values contained in the set values loaded on the SDRAM 29 in step S241 and prior to pause. The real-time processing CPU 12 sets the read values to the registers in the real-time processing CPU 12 and the registers in the interfaces in the real-time processing CPU 12.

The operating system 141 runs, starting with the correct values set for the registers in the real-time processing CPU 12 and the registers in the interfaces of the real-time processing CPU 12. The real-time processing CPU 12 is thus free from running away and the operating system 141 and application program 142 loaded on the SDRAM 29 prior to the transition to the suspension state S3 are prevented from being destroyed. The operating system 141 and application program 142 are thus correctly and reliably executed.

Figure 24:
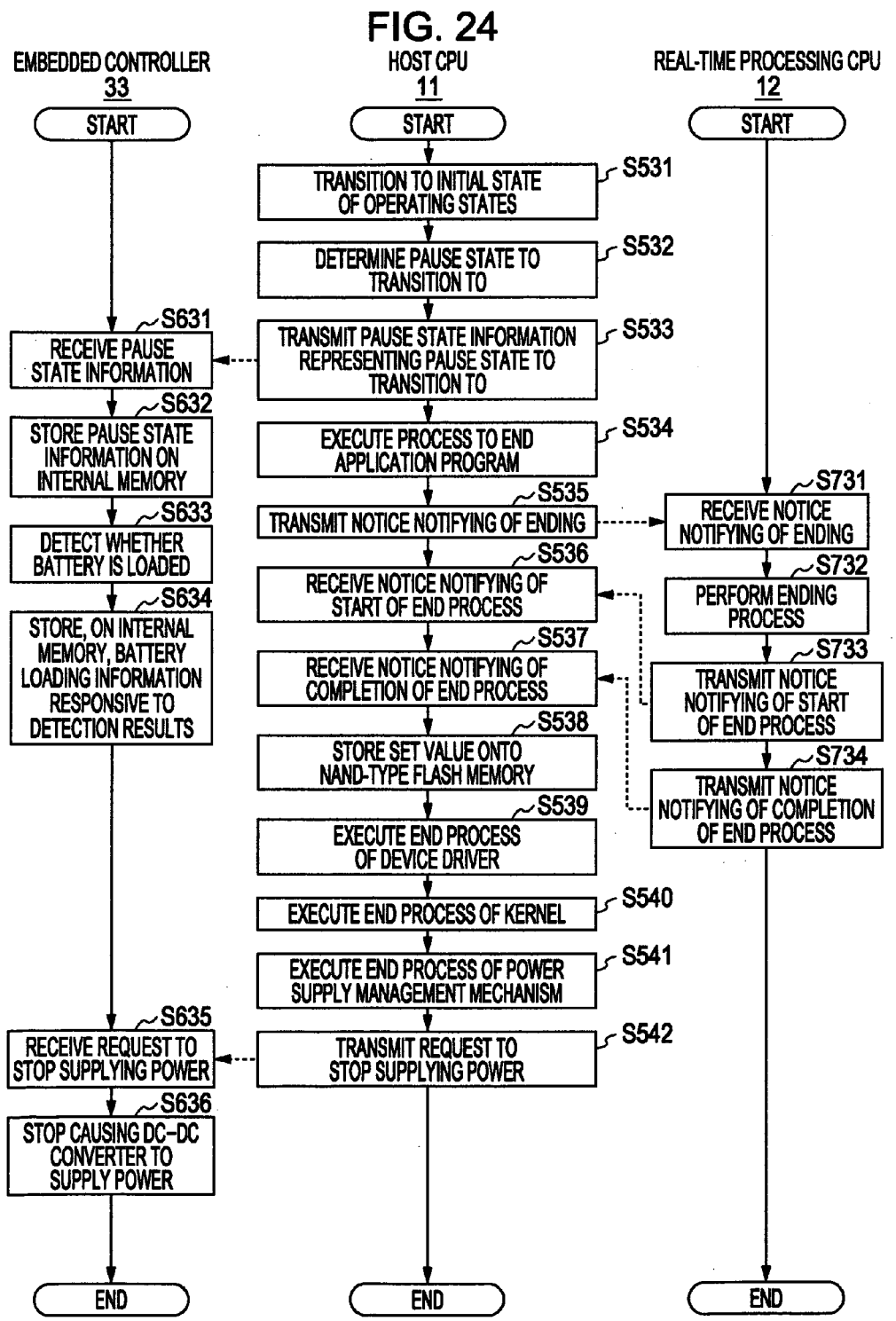
FIG. 24 is a flowchart illustrating in detail the pause process.

FIG. 24 is a flowchart illustrating another example of the pause process.

Figure 23:
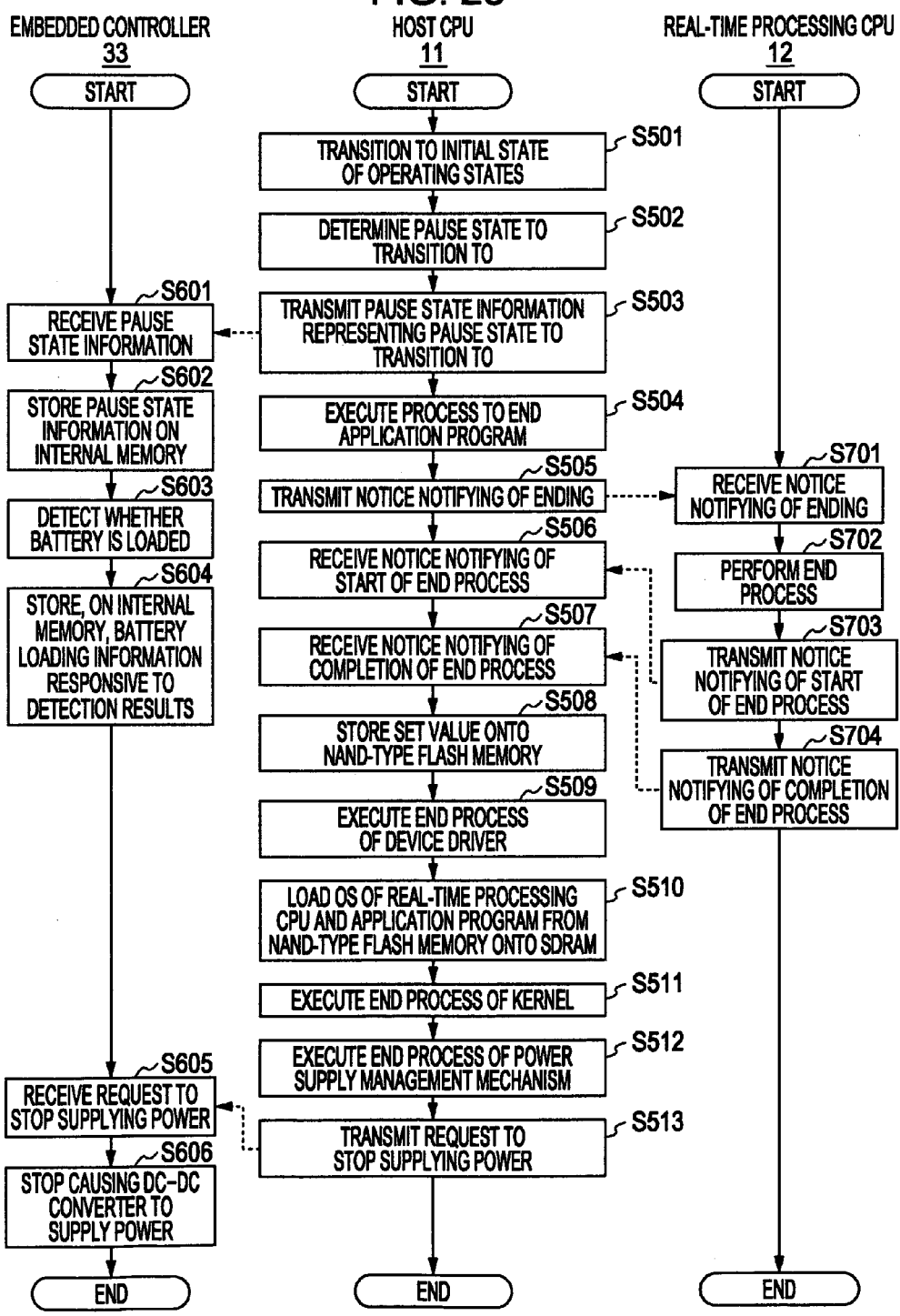
FIG. 23 is a flowchart illustrating in detail the pause process.

Steps S531 through S539, steps S631 through S634, and steps S731 through S734 are respectively identical to steps S501 through S509, steps S601 through S604 and steps S701 through S704 of FIG. 23, the discussion thereof is omitted here.

The operating system 141 and application program 142 of the real-time processing CPU 12 are not loaded onto the SDRAM 29 in the end process of the device driver 72 in the pause process illustrated in the flowchart of FIG. 24.

Steps S540 through S542 and steps S635 and S636 are respectively identical to steps S511 through S513 and steps S605 and S606 of FIG. 23, and the discussion thereof is omitted here.

The operating system 141 and application program 142 of the real-time processing CPU 12 may not be loaded onto the SDRAM 29 in the end process of the device driver 72.

The loading of the operating system 141 and application program 142 to the SDRAM 29 takes a predetermined period of time. If the operating system 141 and application program 142 are not loaded to the SDRAM 29, the pause process can be performed for a shorter period of time.

The set values stored on the NAND-type flash memory 17 do not contain the values at the registers in the real-time processing CPU 12 and the values at the registers in the interfaces in the real-time processing CPU 12 stored on the SDRAM 29 in step S538 as the variables of the operating system 141 and application program 142.

The memory area of the NAND-type flash memory 17 required to store the set values is thus reduced.

The hot boot startup process discussed with reference the flowcharts of FIGS. 17 through 19 may be performed subsequent to the pause process discussed with reference to the flowchart of FIG. 24. In such a case, prior to steps S242, the host CPU 11 for executing the other CPU program reading program 124 of the secondary boot loader 101 loads the operating system 141 and application program 142 of the real-time processing CPU 12 from the NAND-type flash memory 17 to the SDRAM 29.

A storage process of storing history of an unloading operation of the battery 35 is described below with reference to a flowchart of FIG. 25. The storage process is performed by the embedded controller 33 at every predetermined intervals. The embedded controller 33 is powered from the DC-DC converter 34 in the pause state and powered from the battery 36 in the mechanical-off state G3.

Figure 25:
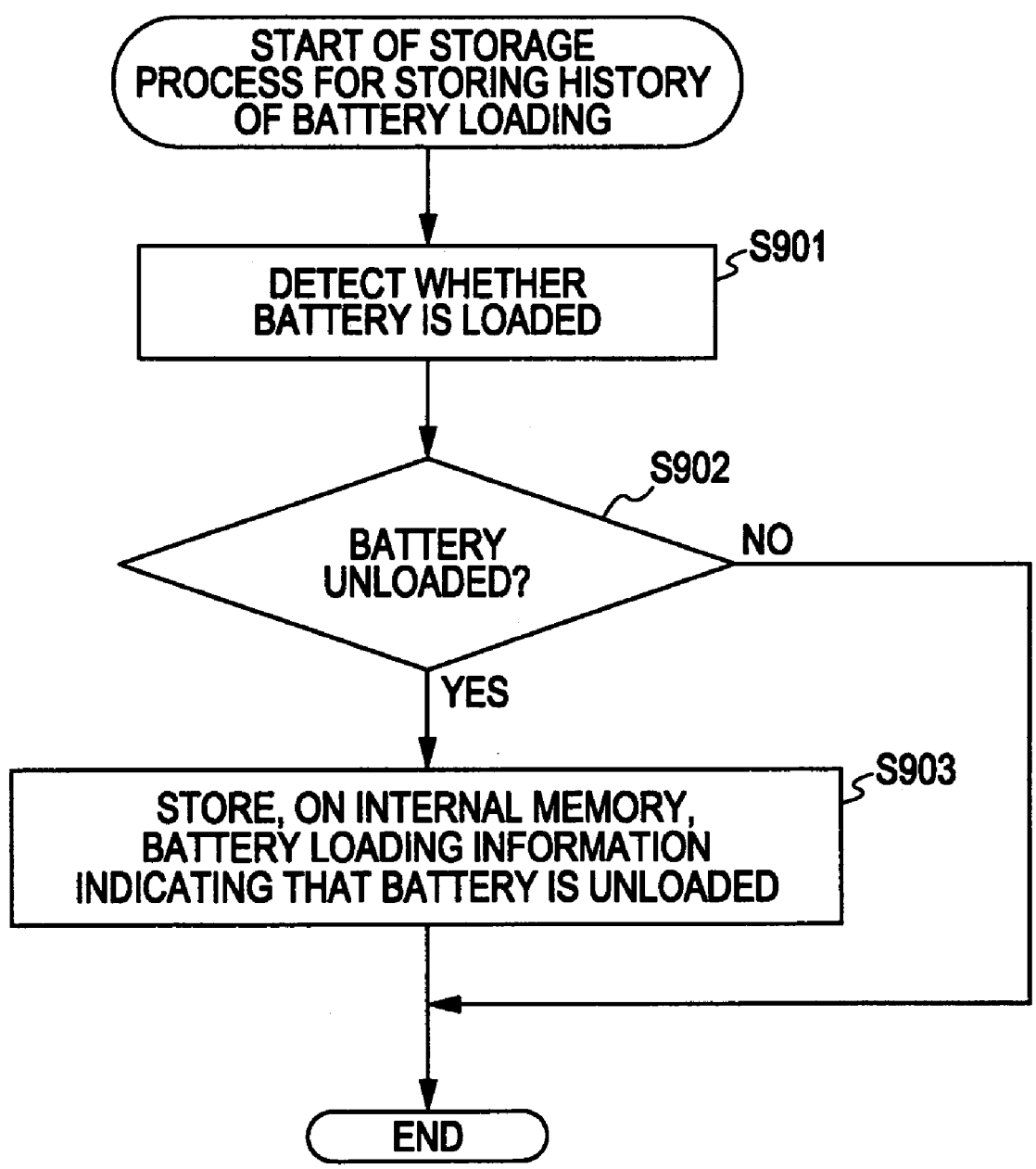
FIG. 25 is a flowchart illustrating a storage process of history of battery loading.

FIG. 25 is the flowchart illustrating the storage process of the history of unloading of the battery 35. In step S901, the embedded controller 33 for executing the battery loading detection program 206 detects the output voltage of the DC-DC converter 34, thereby detecting the loading of the battery 35. For example, in step S901, the battery loading detection program 206 compares the output voltage of the DC-DC converter 34 with a predetermined threshold value, thereby determining whether the battery 35 is loaded or unloaded.

In step S902, the embedded controller 33 for executing the startup method determination information storage processing program 204 determines whether the battery 35, is unloaded. If it is determined in step S902 that the battery 35 is unloaded, processing proceeds to step S903. The embedded controller 33 for executing the startup method determination information storage processing program 204 stores the battery loading information on the internal memory thereof. Processing thus ends. If the battery 35 is unloaded, the battery loading information stored on the embedded controller 33 is updated to indicate that the battery 35 is unloaded.

If it is determined in step S902 that the battery 35 is not unloaded, it is not necessary to update the battery loading information stored on the embedded controller 33. Processing thus ends with step S903 skipped.

If the battery 35 is unloaded in the pause state, the battery loading information is updated to indicate that the battery 35 is unloaded. The battery loading information thus indicates the history of the loading of the battery 35 in the pause state.

In step S901, the embedded controller 33 for executing the battery loading detection program 206 may detect the stop of the supplying of power from an external power supply by detecting the output voltage of the DC-DC converter 34 and in step S902, the embedded controller 33 for executing the startup method determination information storage processing program 204 may determine whether the external power supply stops supplying power. If it is determined in step S902 that the external power supply stops supplying power, the embedded controller 33 for executing the startup method determination information storage processing program 204 may store onto the internal memory thereof the battery loading information indicating the stop of power supplying from the external power supply in step S903. The battery loading information then indicates a history of power supplying from the external power supply.

Furthermore, in step S901, the embedded controller 33 for executing the battery loading detection program 206 may detect the stop of power supplying from the external power supply and the loading of the battery 35 by detecting the output voltage of the DC-DC converter 34 and, in step S902, the embedded controller 33 for executing the startup method determination information storage processing program 204 may determine whether the external power supply stops supplying power and whether the battery 35 is unloaded. If it is determined in step S902 that the external power supply stops supplying power and that the battery 35 is unloaded, the embedded controller 33 for executing the startup method determination information storage processing program 204 may store on the internal memory thereof the battery loading information indicating that the external power supply stops supplying power and that the battery 35 is unloaded.

The battery loading information is one example of information that indicates the history of stop of power supplying to maintain the suspension state S3 of the pause state. The battery loading detection program 206 detects the stop of power supplying to maintain the suspension state S3 of the pause state.

Figure 26:
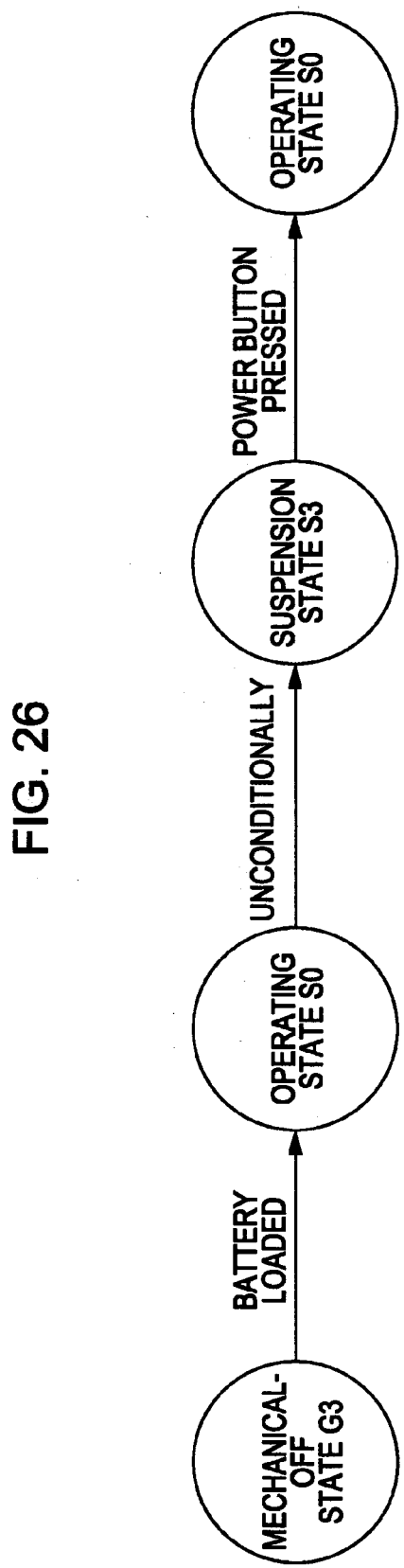
FIG. 26 illustrates an example of state transition at startup.

If the battery 35 is loaded in the mechanical-off state G3 as shown in FIG. 26, the digital still camera is started up in one of the cold boot and the warm boot and transitioned to the operating state S0 in response to the start trigger caused by the loading of the battery 35. The digital still camera may be transitioned from the operating state S0 to the suspension state S3 unconditionally. In such a case, neither startup screen nor startup sound is output.

Even if one of the cold boot startup process and the warm boot startup process takes time, the digital still camera is set to pause in the suspension state S3 simply by loading the battery 35 before the user knows.

With the power button pressed in the suspension state S3, the digital still camera is started up to the operating state S0 in the hot boot startup method. In response to another trigger such as the opening of the lens cap, the digital still camera may be transitioned from the suspension state S3 to the operating state S0 in the hot boot startup method.

To the user, the digital still camera appears to start up quickly from the mechanical-off state G3 in response to a trigger such as the pressing of the power button.

The digital still camera transitions to the pause state or the operating state S0 in response to the user operation. In the transition from the pause state to the operating state S0, the digital still camera quickly starts up.

If the digital still camera is started up in the middle of the suspension state S3 without unloading the battery 35, the hot boot startup method is used. If the user unloads and then loads back the battery 35 in the suspension state S3, the digital still camera is started in the warm boot startup method. The digital still camera, once paused in the hibernation state S4, is started up in the warm boot startup method regardless of whether the battery 35 is loaded or not. It appears to the user that the pause state is a power-off state (mechanical-off state G3).

If transitioned to the suspension state as the pause state, the digital still camera resumes operation from the suspension state. The digital still camera may be transitioned to the initial state of the operating state with the execution of the application process limited, receive a signal representing a startup trigger and be started up in the suspension state. In such a case, the digital still camera returns to the initial state in the startup process. The digital still camera may be transitioned to an application execution ready state of an application process responsive to a startup trigger type. In such a case, the digital still camera can quickly start in response to the operation of the user.

The digital still camera may be transitioned to the initial state of the operating state with the execution of the application process limited, receive information representing the startup trigger and be started up in the suspension state. In such a case, the digital still camera returns to the initial state in the startup process. The digital still camera may be transitioned to an application execution ready state of an application process responsive to the startup trigger type. In such a case, the digital still camera can quickly start in response to the operation of the user.

The digital still camera is transitioned to the initial state SON if started in one of the warm boot and the cold boot. Even when the digital still camera is transitioned to the initial state SON as a result of one of the warm boot and the cold boot, the digital still camera may be transition to a process responsive to the trigger type of the initial state SON.

Unlike ordinary personal computers, the digital still camera is subject to a shut-down operation. Power to the host CPU 11 can be cut off even if the host CPU 11 is in the middle of performing any process. Although an amount data recorded on a recording medium such as the NAND-type flash memory 26 is not increased, a recording capacity in the recording medium available to the file system of the computer is reduced.

The operating system 61 executed by the host CPU 11 includes, as one example of the kernel 71, a file system used to manage data to be recorded on the recording medium such as the NAND-type flash memory 26. In the file system, an index such as a file allocation table maps a file name of a file to be recorded on the recording medium to a recording unit such as a sector on which data is actually recorded.

The file allocation table contains information as to which sector is used (records data) and which sector remains unused (does not record data). Along with data recording onto the recording medium, the file allocation table is correctly updated so that the recording medium is effectively used as a resource having a predetermined recording capacity.

In the file system, system calls "open," "read," "write" and "close" processes are performed to read and write data.

Data writing performed through the file system is carried out by caching data onto the SDRAM 29. The data once recorded on the SDRAM 29 is written later on the recording medium such as the NAND-type flash memory 26. In a file system process, information related to a used sector in the file allocation table is updated in response to an amount of data to be written. As a background job, the data is transferred to the NAND-type flash memory 26 at a data speed of a bus. When the system call "close" process in the file system is completed, all data cached is written on the recording medium such as the NAND-type flash memory 26. The data write process is thus completed.

In this way, time to write data onto the recording medium such as the NAND-type flash memory 26 is hidden from users and response time is shortened. Data rate on the NAND-type flash memory 26 is typically slower than data rate to the SDRAM 29.

When the computer is switched off prior to the end of the system call "close" process, data cached on the SDRAM 29 is missing without being fully written on the NAND-type flash memory 26. The information regarding the used sectors in the file allocation table is updated, and a sector actually not used can be recognized as an actually used sector.

If the computer is repeatedly switched off prior to the end of the system call "close" process, the available memory capacity of the NAND-type flash memory 26 appears to be reduced although the amount of data recorded on the NAND-type flash memory 26 does not increase if viewed from the file system.

Available programs recovers information of sectors used in the file allocation table so that information regarding the actually used sectors is consistent with information regarding the sectors used in the file allocation table. Such a program is referred to as recovery program. In one method, such a recovery program is executed while the apparatus is not used. Power needs to be continuously supplied to the apparatus to execute the recovery program. Such a method is not appropriate for the digital still camera, which needs to be powered from a battery for a long period of time.

In accordance with embodiments of the present invention, the recovery program is executed, as necessary, when the digital still camera is started up in one of the warm boot and the cold boot. The recovery program may also be executed, as necessary, when the digital still camera is started up in the hot boot. The recovery program takes a predetermined period of time to recover information of sectors used in the file allocation table. If the recovery program is initiated when the digital still camera is started up in the hot boot, the user may feel uncomfortable with time-consuming operation in startup. Preferably, the recovery program is initiated as necessary when one of the warm boot process and the cold boot process is executed. The warm boot process and the cold boot process take more time than the hot boot startup process.

More specifically, the operating system 61 executed by the host CPU 11 checks the available memory space of the NAND-type flash memory 26. If the available memory space is not larger than a predetermined threshold value, the recovery program is executed. The recovery program recovers the information regarding the sectors used in the file allocation table so that the actually used sectors are consistent with the information regarding the sectors used in the file allocation table.

Figure 22:
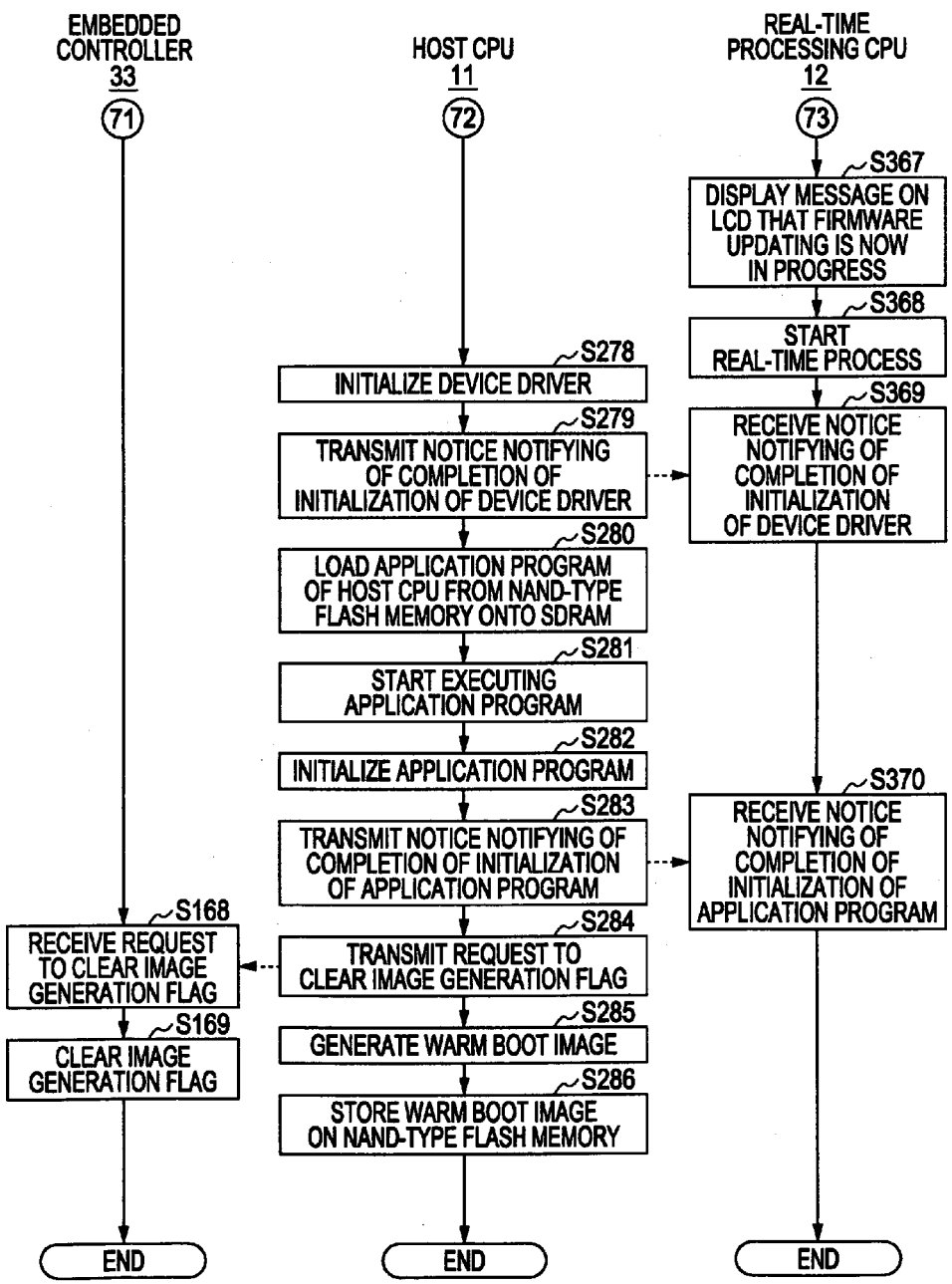
FIG. 22 is a continuation of the flowchart of FIG. 21.

For example, a recovery execution process of FIG. 27 may be performed if the digital still camera is started up in the warm boot, or if the digital still camera is started up in the cold boot subsequent to step S281 of FIG. 16, or subsequent to step S278 of FIG. 22.

FIG. 27 is a flowchart illustrating the recovery execution process controlled by the kernel 71 of the operating system 61 executed by the host CPU 11.

In step S1001, the host CPU 11 determines whether the startup method determined by the startup method determination program 122 is the warm boot startup method or the cold boot startup method. If it is determined in step S1001 that the startup method is the warm boot startup method or the cold boot startup method, processing proceeds to step S1002.

In step S1002, the host CPU 11 checks the file allocation table of the file system used to manage data to be stored on the NAND-type flash memory 26. The file allocation table contains information relating to which sectors are used (or remain unused).

In step S1003, the host CPU 11, calculates the available memory capacity of the NAND-type flash memory 26 based on the determination results in step S1002.

In step S1004, the host CPU 11 determines whether the available memory capacity of the application program 62 calculated in step S1003 is not larger than a set threshold value.

If it is determined in step S1004 that the available memory capacity of the application program 62 calculated in step S1003 is not larger than a set threshold value, processing proceeds to step S1005.

In step S1005, the host CPU 11 executes the recovery program. The recovery program recovers the information regarding the sectors used in the file allocation table so that the information regarding the actually used sectors is consistent with the information regarding the sectors used in the file allocation table.

If it is determined in step S1004 that the available memory capacity of the application program 62 calculated in step S1003 is larger than a set threshold value, step S1005 is skipped.

If it is determined in step S1001 that the startup method is neither the warm boot startup method nor the cold boot startup method, i.e., that the startup method is the hot boot startup method, steps S1002 through S1005 are skipped.

The digital still camera may be switched off prior to the end of the system call "close" process, and the available memory capacity of the recording medium such as the NAND-type flash memory 26 may be reduced if viewed from the file system although the amount of data recorded on the NAND-type flash memory 26 is not increased. In such a case, the information regarding the sectors used in the file allocation table is recovered when the digital still camera is started up in one of the warm boot and the cold boot. The NAND-type flash memory 26 is effectively used as a resource having a predetermined recording capacity.

The present invention is applicable not only to the digital still camera but also to mobile apparatuses including a personal computer, a digital video camera, a cell phone, and a mobile player, and stationary apparatuses including a HDD recorder and player and a television receiver.

The above-described series of process steps may be performed using hardware or software. If the above-described series of process steps are performed using software, a program forming the software may be installed from a program recording medium to a computer contained in dedicated hardware or a general-purpose computer that can perform a variety of processes with a variety programs installed thereon.

The program to be executed by the computer (such as the host CPU 11, the real-time processing CPU 12 or the embedded controller 33) may be recorded on a removable medium and then supplied as a package medium including the removable medium. The package media may include magnetic disks (including a flexible disk), optical disks (including compact-disk read-only memory (CD-ROM), and digital versatile disk (DVD)), a magneto-optical disk, and a semiconductor memory. The program may also be supplied via wired or wireless communication media including a local area network (LAN), the Internet, and digital satellite broadcasting systems.

The removable medium is loaded on a drive connected to the IDE interface 28 and the program is then stored onto the NAND-type flash memory 17 via the IDE interface 28. The program is thus installed. The program is received via a wireless communication medium and the wireless LAN interface 24 or via a wired communication medium and the general-purpose input-output unit 32, and then stored onto the NAND-type flash memory 17. The program is thus installed. Alternatively, the program may be pre-stored on the NAND-type flash memory 17.

The program may be performed in the time-series order previously discussed or may be performed at proper timing when each call is made.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus for transitioning from an operating state for performing a process in accordance with an application program to a pause state and for transitioning back from the pause state to the operating state in one of a plurality of startup methods, the information processing apparatus comprising:
  startup method determination means for determining whether the startup method in a transition from the pause state to the operating state is a predetermined one of the plurality of startup methods;
  capacity calculation means for calculating a capacity available in a recording medium loaded on own information processing apparatus if the startup method determination means determines that the startup method is the predetermined one of the plurality of startup methods; and
  recovery execution determination means for determining whether to perform a recovery program for recovering an index of a file system managing data, recorded on the recording medium, based on the capacity available in the recording medium calculated by the capacity calculation means.

2. The information processing apparatus according to claim 1, wherein the plurality of startup methods comprises at least a first startup method and a second startup method,
  wherein data loading to a main memory is not performed in the first startup method, and
  wherein data responsive to a software program to be performed by a processor in the operating state is loaded onto the main memory in the second startup method.

3. The information processing apparatus according to claim 2, wherein if the startup method determination means determines that the startup method is the second startup method, the capacity calculation means calculates the available capacity and the recovery execution determination means determines whether to perform the recovery program.

4. The information processing apparatus according to claim 3, wherein the recovery execution determination means outputs determination results to execute the recovery program if the available capacity of the recording medium is not higher than a predetermined threshold value.

5. The information processing apparatus according to claim 3, wherein if the recovery execution determination means outputs determination results to execute the recovery program, the processor executes the recovery program so that information regarding a sector having the index used therewithin is recovered in a manner such that a sector actually used in the recording medium is consistent with the information regarding the sector having the index used therewithin.

6. An information processing method of an information processing apparatus for transitioning from an operating state for performing a process in accordance with an application program to a pause state and for transitioning back from the pause state to the operating state in one of a plurality of startup methods, the information processing method comprising:
  determining whether the startup method in a transition from the pause state to the operating state is a predetermined one of the plurality of startup methods;
  calculating a capacity available in a recording medium loaded on own information processing apparatus if the startup method is determined to be the predetermined one of the plurality of startup methods; and
  determining whether to perform a recovery program for recovering an index of a file system managing data, recorded on the recording medium, based on the calculated capacity available in the recording medium.

7. A computer-readable recording medium having stored thereon a program for causing an information processing apparatus to transition from an operating state for performing a process in accordance with an application program to a pause state and transition back from the pause state to the operating state in one of a plurality of startup methods, the program comprising:
  determining whether the startup method in a transition from the pause state to the operating state is a predetermined one of the plurality of startup methods;
  calculating a capacity available in a recording medium loaded on own information processing apparatus if the startup method is determined to be the predetermined one of the plurality of startup methods; and
  determining whether to perform a recovery program for recovering an index of a file system managing data, recorded on the recording medium, based on the calculated capacity available in the recording medium.

8. An information processing apparatus for transitioning from an operating state for performing a process in accordance with an application program to a pause state and for transitioning back from the pause state to the operating state in one of a plurality of startup methods, the information processing apparatus comprising:
  a startup method determination unit determining whether the startup method in a transition from the pause state to the operating state is a predetermined one of the plurality of startup methods;
  a capacity calculation unit calculating a capacity available in a recording medium loaded on own information processing apparatus if the startup method determination unit determines that the startup method is the predetermined one of the plurality of startup methods; and
  a recovery execution determination unit determining whether to perform a recovery program for recovering an index of a file system managing data, recorded on the recording medium, based on the capacity available in the recording medium calculated by the capacity calculation unit.

* * * * *